United States Patent
Tsuchiya et al.

(10) Patent No.: US 8,619,319 B2
(45) Date of Patent: Dec. 31, 2013

(54) IMAGE PROCESSOR AND IMAGE PROCESSING METHOD

(75) Inventors: Okinori Tsuchiya, Yokohama (JP);
Fumihiro Goto, Kawasaki (JP);
Akitoshi Yamada, Yokohama (JP);
Akihiko Nakatani, Kawasaki (JP);
Mitsuhiro Ono, Tokyo (JP); Fumitaka Goto, Tokyo (JP); Takashi Fujita, Kawasaki (JP); Rie Kajihara, Minoo (JP); Ayumi Sano, Kawasaki (JP);
Tomokazu Ishikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 453 days.

(21) Appl. No.: 12/896,523

(22) Filed: Oct. 1, 2010

(65) Prior Publication Data
US 2011/0085183 A1 Apr. 14, 2011

(30) Foreign Application Priority Data
Oct. 9, 2009 (JP) ................................. 2009-235328

(51) Int. Cl.
*G06F 15/00* (2006.01)
*G06K 1/00* (2006.01)
*G06K 15/02* (2006.01)

(52) U.S. Cl.
USPC .......................................... 358/1.2; 358/3.02

(58) Field of Classification Search
None
See application file for complete search history.

(56) References Cited

U.S. PATENT DOCUMENTS

| 6,222,950 B1 * | 4/2001 | Sugiura et al. ................ 358/1.9 |
| 6,511,143 B1 | 1/2003 | Ishikawa et al. |
| 7,099,046 B2 | 8/2006 | Yamada |
| 7,312,901 B2 | 12/2007 | Yamada |
| 7,548,346 B2 | 6/2009 | Yamada |
| 7,672,011 B2 | 3/2010 | Kato |
| 7,855,809 B2 | 12/2010 | Kato |
| 7,859,723 B2 | 12/2010 | Yamada |
| 2006/0274096 A1 * | 12/2006 | Kanda et al. .................... 347/14 |
| 2007/0121137 A1 * | 5/2007 | Kakutani ....................... 358/1.9 |

FOREIGN PATENT DOCUMENTS

| JP | 2000-103088 | 4/2000 |
| JP | 2003-53963 | 2/2003 |
| JP | 2008-162151 | 7/2008 |
| JP | 2009-148988 | 7/2009 |

OTHER PUBLICATIONS

U.S. Appl. No. 12/952,819, filed Nov. 23, 2010.
U.S. Appl. No. 12/962,044, filed Dec. 7, 2010.
U.S. Appl. No. 12/896,539, filed Oct. 1, 2010.
U.S. Appl. No. 12/942,718, filed Nov. 9, 2010.
Japanese Office Action dated Jan. 29, 2013 issued during prosecution of related Japanese application No. 2009-235328.

* cited by examiner

*Primary Examiner* — Douglas Tran
(74) *Attorney, Agent, or Firm* — Fitzpatrick, Cella, Harper & Scinto

(57) ABSTRACT

Inputted image data is converted to M number of multi-value data having a lower resolution than the inputted image data, and after quantization processing has been performed for each of the M number of multi-value data, an image is printed by M number of relative movements (M-pass printing) that corresponds to the M number of quantized data. By doing so, when compared with the case in which a resolution reduction process is not performed, it is possible to suppress the number of pixels that become the object of quantization processing, and it becomes possible to output an image with no fluctuation in image density or density unevenness without a decrease in the processing speed.

20 Claims, 20 Drawing Sheets

| | FIRST PLANE | SECOND PLANE |
|---|---|---|
| FIG.4A | 1 0 0 1 / 0 1 0 0 / 0 0 1 0 | 0 0 1 0 / 1 0 0 0 / 0 1 0 1 |
| FIG.4B | 1 0 0 1 / 0 1 0 0 / 0 0 1 0 | 0 0 1 0 / 1 1 0 0 / 0 0 0 1 |
| FIG.4C | 1 0 0 1 / 0 1 0 0 / 0 0 1 0 | 0 0 0 1 / 1 1 0 0 / 0 0 1 0 |
| FIG.4D | 1 0 0 1 / 0 1 0 0 / 0 0 1 0 | 1 0 0 1 / 0 1 0 0 / 0 0 0 1 |
| FIG.4E | 1 0 0 1 / 0 1 0 0 / 0 0 1 0 | 1 0 0 1 / 0 1 0 0 / 0 0 1 0 |
| FIG.4F | 1 0 0 1 / 0 1 0 0 / 0 0 1 0 | 0 0 0 1 / 0 1 0 0 / 0 0 1 0 |
| FIG.4G | 1 0 0 1 / 0 1 0 0 / 0 0 1 0 | 0 0 0 0 / 0 0 0 0 / 0 0 0 1 |

| | TOTAL NUMBER OF DOTS | NUMBER OF OVERLAPPING DOTS | DOT OVERLAP RATE (%) |
|---|---|---|---|
| (A) | 8 | 0 | 0 (=0÷8×100) |
| (B) | 8 | 2 | 25 (=2÷8×100) |
| (C) | 8 | 4 | 50 (=4÷8×100) |
| (D) | 8 | 6 | 75 (=6÷8×100) |
| (E) | 8 | 8 | 100 (=8÷8×100) |
| (F) | 7 | 6 | 86 (=6÷7×100) |
| (G) | 6 | 2 | 33 (=2÷6×100) |

FIG.4H

DIFFUSION MATRIX A

|   | ● | 9 | 3 |
|---|---|---|---|
| 5 | 9 | 3 |   |
|   | 3 |   |   |

●PIXEL TO BE PROCESSED

FIG.7A

DIFFUSION MATRIX B

|   |   | ● | 2 | 1 |
|---|---|---|---|---|
| 1 | 1 | 2 | 1 |   |

●PIXEL TO BE PROCESSED

FIG.7B

FIG.15
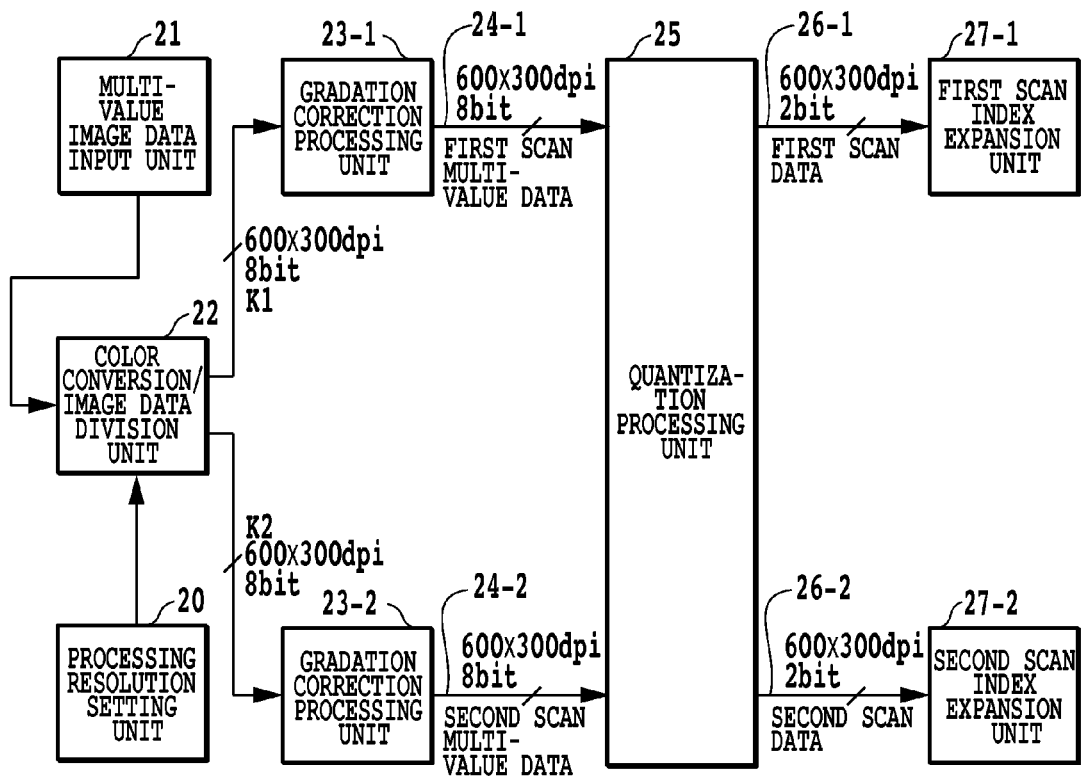
FIG.15A

IMAGE PROCESSOR AND IMAGE PROCESSING METHOD

BACKGROUND OF THE INVENTION

1. Field of the Invention

The present invention relates to an image processor and image processing method that process multi-value image data that correspond to the same area in order to print an image in the same area by relatively moving a printing unit or a plurality of printing element groups a plurality of times with respect to the same area of a printing medium.

2. Description of the Related Art

In inkjet printing devices, a multipass printing method that prints by performing a plurality of printing scans of image data to be printed in the same area of a printing medium is known as a technique for reducing density unevenness and stripes. However, recently, by performing multipass printing, a new adverse effect of image due to deviation of print position among printing scans is viewed with suspicion. Here, deviation of the printing position among printing scans is, for example, deviation between a dot group that is printed in a first printing scan and a dot group that is printed in the second printing scan in the same area as the first printing scan. Deviation of these dot groups is caused by fluctuation in the distance between the printing medium and ejection face (paper distance), fluctuation in the conveyed amount of the printing medium, and the like, when this happens, the dot coverage rate on the paper fluctuates, which causes density fluctuation and density unevenness of an image. Therefore, recently, a method for processing image data during multipass printing that is capable of handling deviation in the printing position between planes that occurs due to these kinds of fluctuations in printing conditions is desired.

In Japanese Patent Laid-Open No. 2000-103088, an image data processing method is disclosed for suppressing adverse effects to an image as described above. This patent application focuses on the cause of fluctuation in image density caused by fluctuation in various printing conditions being that the binary image data that are printed in different printing scans are in a complementary relationship with each other. In addition, in order to solve this problem, this patent application discloses a method for dividing image data in the multi-value image data stage before binarization in order to correspond to different printing scans, and then independently (uncorrelated) binarizing the multi-value image data after being divided.

FIG. 8A is a diagram that illustrates the configuration of dots when image data is divided and binarized according to the method of Japanese Patent Laid-Open No. 2000-103088. In this figure, the black dots 1501 are printed in the first printing scan, the white dots 1502 are printed in the second printing scan, and the gray dots 1503 are printed the first printing scan and second printing scan overlap. Here, there is no complementary relationship between the dots that are printed in the first printing scan and the dots that are printed in the second printing scan. Therefore, there are portions (gray dots) 1503 where two dots overlap, and there are also blank areas where no dots are printed.

In this kind of dot arrangement, the dot coverage rate on the printing medium does not fluctuate much even though the dot group that is printed in the first printing scan and the dot group that is printed in the second printing scan shift the amount of one pixel in the main scanning direction or sub scanning direction. This is because new areas where dots printed in the first printing scan overlap dots printed in the second printing scan appear, however; there are also portions where two dots that were originally supposed to overlap no longer overlap. Therefore, when performing judgment over a somewhat large area, the dot coverage on the printing medium does not fluctuate much, and thus it is also difficult for changes to occur in the image density. In other words, by employing the method of Japanese Patent Laid-Open No. 2000-103088, it is possible to suppress the occurrence of density fluctuation and density unevenness in an image even when fluctuation in the distance between the printing medium and ejection face (paper distance), or fluctuation in the conveying amount of the printing medium occurs.

However, when using the method disclosed in Japanese Patent Laid-Open No. 2000-103088, the number of pixels that are to be the object of quantization processing increases by the amount of the divided planes. Therefore, it takes more time to complete quantization when compared with the case in which quantization is performed for just one gradation plane, and thus a new problem occurs in that the processing speed becomes slower. In order to avoid this problem, a large capacity memory can be prepared, or a CPU can be prepared that has superior processing capability, however; the cost of the device then increases.

SUMMARY OF THE INVENTION

The object of the present invention is to solve the problems described above. In other words, the object of the present invention is to provide an image processor and image processing method that are capable of outputting images in multipass printing that have no fluctuation in image density or density unevenness due to deviation during printing, and are capable of outputting such images without a drop in processing speed or increase in cost.

The first aspect of the present invention is an image processor that processes input image data that corresponds to a pixel area in order to print dots in the pixel area on a printing medium by M number of relative movements between a printing unit that prints dots and the printing medium, comprising: a unit configured to convert the input image data to M number of multi-value data, having lower resolution than the input image data, in order to correspond to the M number of relative movements; a unit configured to quantize each of the M number of multi-value data and to create M number of quantized data having a lower number of levels than the multi-value data; and a unit configured to binarize each of the M number of quantized data, and create M number of binary data having a higher resolution than the quantized data so that the printing unit can print dots in the pixel area by the M number of relative movements.

The second aspect of the present invention is an image processor that processes input image data that corresponds to a pixel area in order to print in the pixel area on a printing medium by M number of relative movements between a printing unit that prints dots and the printing medium, comprising: a setting unit configured to set one mode from among a plurality of printing modes that include a first mode for printing in the pixel area by performing M number of relative movements, and a second mode for printing in the pixel area by performing N (N>M) number of relative movements; a unit configured to convert the input image data to M number of multi-value data, having a resolution that is lower than the resolution of the input image data, in order to correspond to the M number of relative movements when the first mode has been set by the setting unit; a unit configured to quantize each of the M number of multi-value data and create M number of first quantized data having a number of levels that is less than the multi-value data; a unit configured to binarize each of the M number of first quantized data, and create M number of binary data having a higher resolution than the first quantized data so that the printing unit can print dots in the pixel area by the M number of relative movements; a unit configured to quantize the input mage data and create second quantized data when the second mode has been set by the setting unit; and a unit configured to divide the second quantized data into N number of divisions and create N number of binary data so that the printing unit can print dots in the pixel area by N number of relative movements.

The third aspect of the present invention is An image processing method that processes input image data that corresponds to a pixel area in order to print dots in that pixel area on a printing medium by M number of relative movements between a printing unit that prints dots and the printing medium, comprising the steps of: converting the input image data to M number of multi-value data, having lower resolution than the input image data, in order to correspond to the M number of relative movements; quantizing each of the M number of multi-value data, and creating M number of quantized data having a lower number of levels than the multi-value data; and binarizing each of the M number of quantized data, and creating M number of binary data having a higher resolution than the quantized data so that the printing unit can print dots in the pixel area by the M number of relative movements.

Further features of the present invention will become apparent from the following description of exemplary embodiments (with reference to the attached drawings).

BRIEF DESCRIPTION OF THE DRAWINGS

FIGS. 4A to 4H are diagrams for explaining the dot overlap rate;

FIGS. 7A and 7B are diagrams that illustrate one example of an error-diffusion matrix that is used in quantization processing;

FIG. 14 is a block diagram showing the relationship of FIGS. 14A and 14B;

FIG. 15 is a block diagram showing the relationship of FIGS. 15A and 15B;

FIG. 15A and FIG. 15B are block diagrams for explaining the steps of image processing executed in a third embodiment;

DESCRIPTION OF THE EMBODIMENTS

In the following, embodiments of the present invention will be explained in detail with reference to the accompanying drawings.

The embodiments explained below use an inkjet printer as an example, however; the present invention is not limited to an inkjet printer. The invention can be applied to devices other than an inkjet printer as long as the device can print an image on a printing medium via a printing unit that prints dots while moving relative to the printing medium.

The "relative movement (or relative scanning) between the printing unit and the printing medium is an operation of relatively moving (scanning) the printing unit with respect to the printing medium, or an operation of relatively moving (conveying) the printing medium with respect to the printing unit. The printing unit is one or more printing element group (nozzle array) or one or more printing head.

Figure 10:
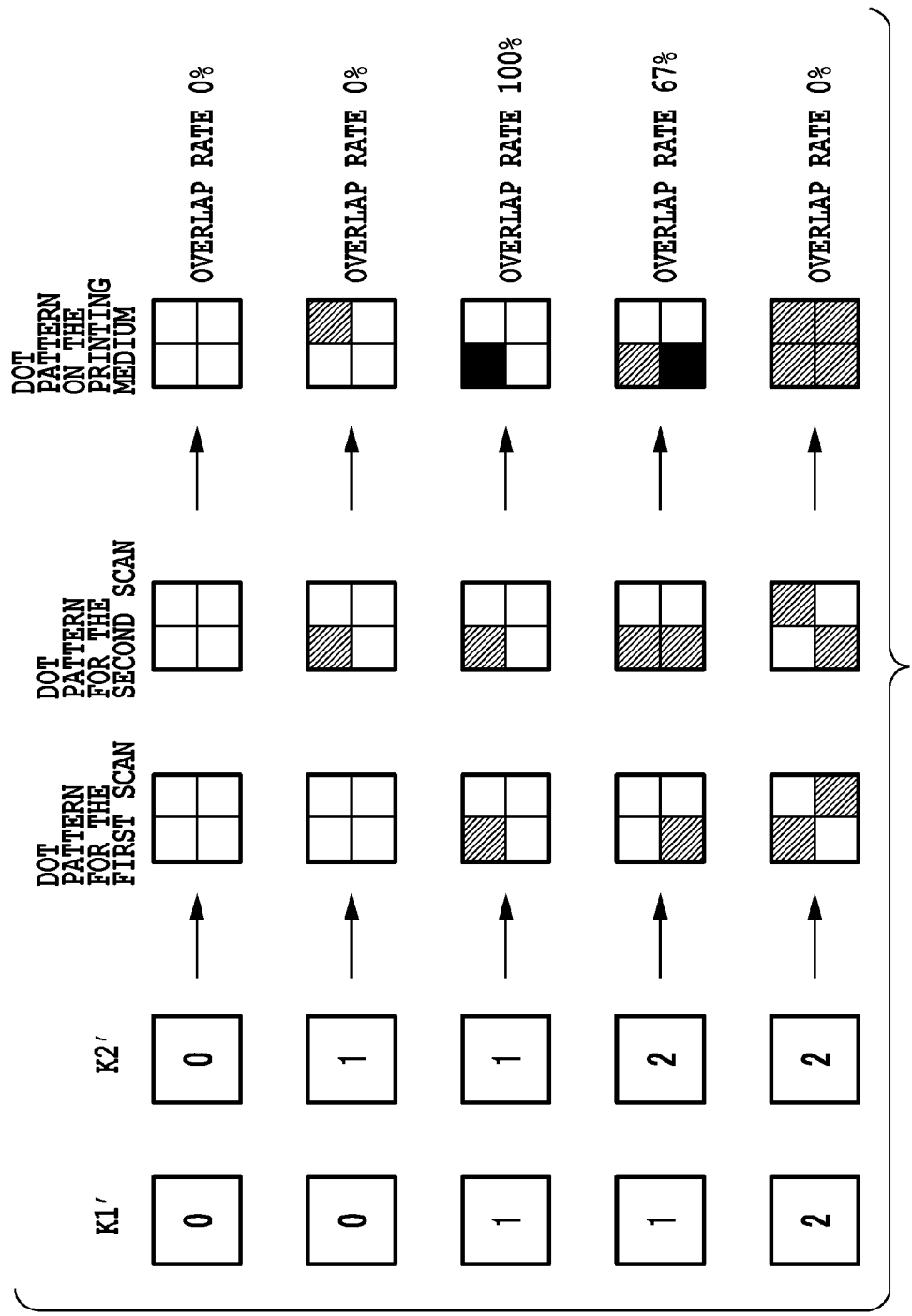
FIG. 10 is a diagram for explaining the dot overlap rate when index expansion processing is performed.

In the image processor explained below, data processing is performed in order to print images in the same area by relatively moving a printing unit a plurality of times, or relatively moving a plurality of printing element groups with respect to the same area of the printing medium (specified area). Here, the "same area (specified area)" is "one pixel area" on a micro scale, or on a macro scale, "an area that can be printed by one relative movement". That the area "may also be called a pixel area (simply a "pixel")" means that the area is the minimum unit for which gradation expression is possible using multi-value image data. On the other hand, "an area that can be printed by one relative movement" is an area on the printing medium that the printing unit passes over during one relative movement, or is an area smaller than that area (for example, one raster area). For example, when executing the multipass mode as illustrated in FIG. 10, on a macro scale, one print area in the figure can also be defined as the same area.

<Summary Explanation of the Printer>

Figure 2A:
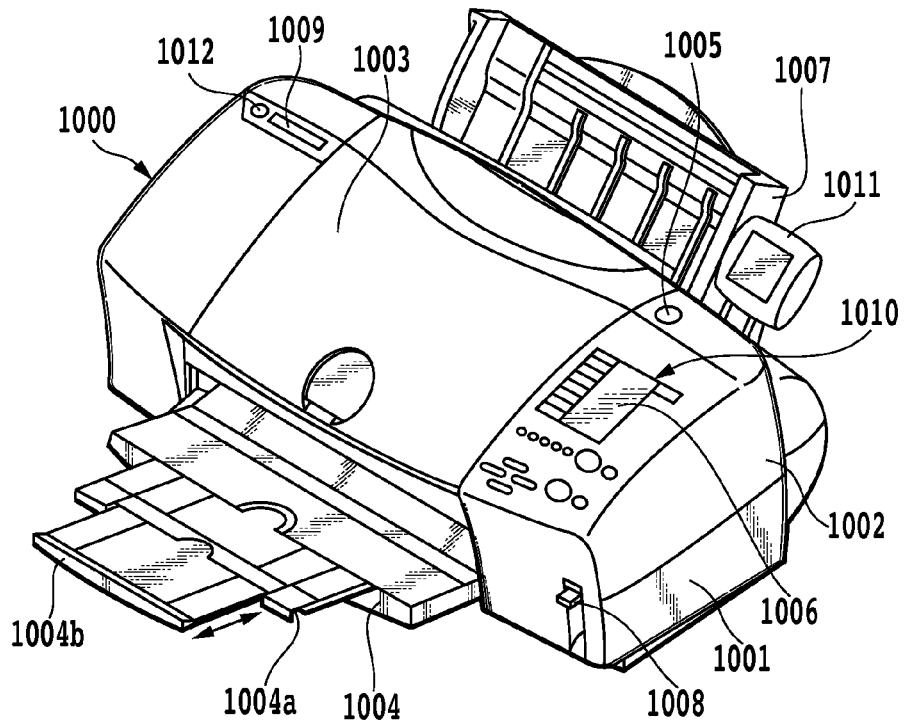
FIGS. 2A and 2B are perspective diagrams and illustrate a photo direct printer of an embodiment of the present invention, and the printing unit of a printer engine.

FIG. 2A is a perspective drawing of a photo direct printer (hereafter referred to as a PD printer) 1000 of an embodiment of the present invention, or in other words, an image formation device (image processor). The PD printer 1000 comprises: a normal function of receiving and printing data from a host computer (PC), a function of directly reading and printing an image that is stored in a memory medium such as a memory card, and a function of receiving and printing an image from a digital camera, PDA or the like.

In FIG. 2A, 1004 is a discharge tray into which printed paper can be stacked, and 1003 is an access cover that a user can open or close when replacing the printing head cartridge or ink tank that are stored in the main unit. Menu items for setting various conditions related to printing (for example, the type of printing medium, image quality, and the like) are displayed on the control panel 1010 that is provided on the upper case 1002, and a user can set these items according to the type and use of the image to be output.

In the figure, 1007 is an auto supply unit that automatically supplies printing medium to the main unit, 1009 is a card slot into which an adapter to which a memory can be mounted is inserted, and 1012 is a USB terminal for connecting a digital camera. A USB connector for connecting a PC is provided on the rear surface of the PD printer 1000.

<Electrical Specifications of the Control Unit>

Figure 3:
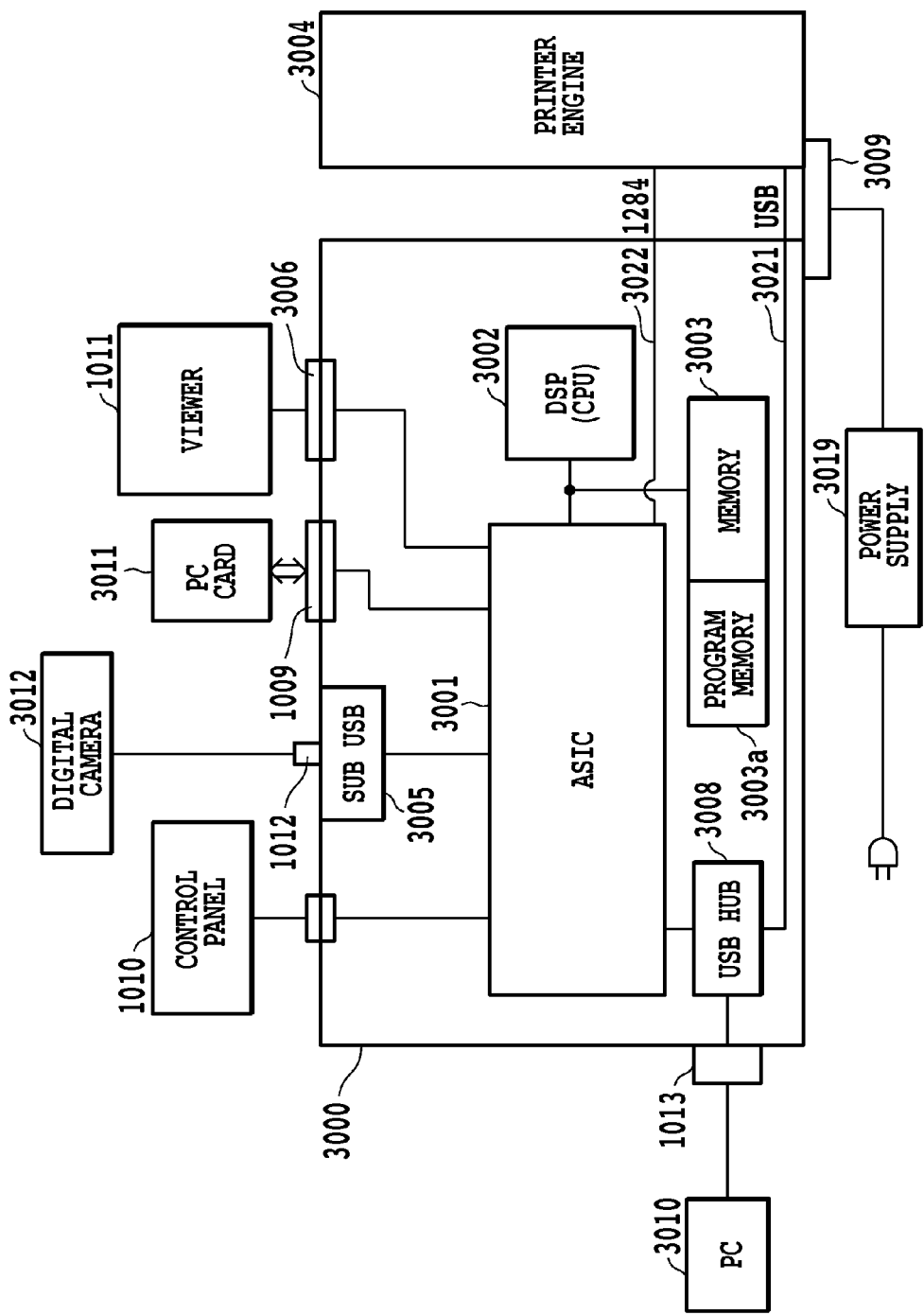
FIG. 3 is a block diagram that illustrates the configuration of PD printer control according to an embodiment of the present invention.

FIG. 3 is a block diagram that illustrates the construction of the main parts for control of the PD printer 1000 of embodiments of the present invention. In FIG. 3, the same reference numbers are used for parts that are common with those in drawings described above, and explanations of those parts area omitted. As will be made clear in the explanation below, the PD printer 1000 functions as an image processor.

In FIG. 3, 3000 is a control unit (control board) and 3001 is an image processing ASIC (special customized LSI). In the figure, 3002 is a digital signal processor (DSP) having an internal CPU, and controls the various control processing and various image processing described later. Reference number 3003 is a memory having a program memory 3003a that stores the control programs for the CPU of the DSP 3002, a RAM area that stores programs during execution, and a memory area that functions as a work memory and stores image data. Reference number 3004 is a printer engine, and here a printer engine is mounted for an inkjet printer that prints color images using a plurality of colors of ink. In the figure, 3005 is a USB connector used as a port for connecting a digital camera (DSC) 3012. Reference number 3006 is a connector for connecting a viewer 1011. Number 3008 is a USB hub, and when the PD printer 1000 prints based on image data from a PC 3010, lets the data pass as is from the PC 3010 to the printer engine 3004 via the USB 3021. In doing so, the connected PC 3010 can execute printing by exchanging data and signals directly with the printer engine 3004 (functions as a typical PC printer).

Reference number 3009 is a power-supply connector, and DC voltage that is converted from the commercially available AC is input from the power supply 3019. The PC 3010 is a typical personal computer, 3011 is a memory card (PC card) as mentioned above, and 3012 is a digital camera (DSC). The exchange of signals between this control unit 3000 and the printer engine 3004 is performed via the USB 3021 described above, or an IEEE-1284 bus 3022.

<Summary of the Printing Unit>

Figure 2B:
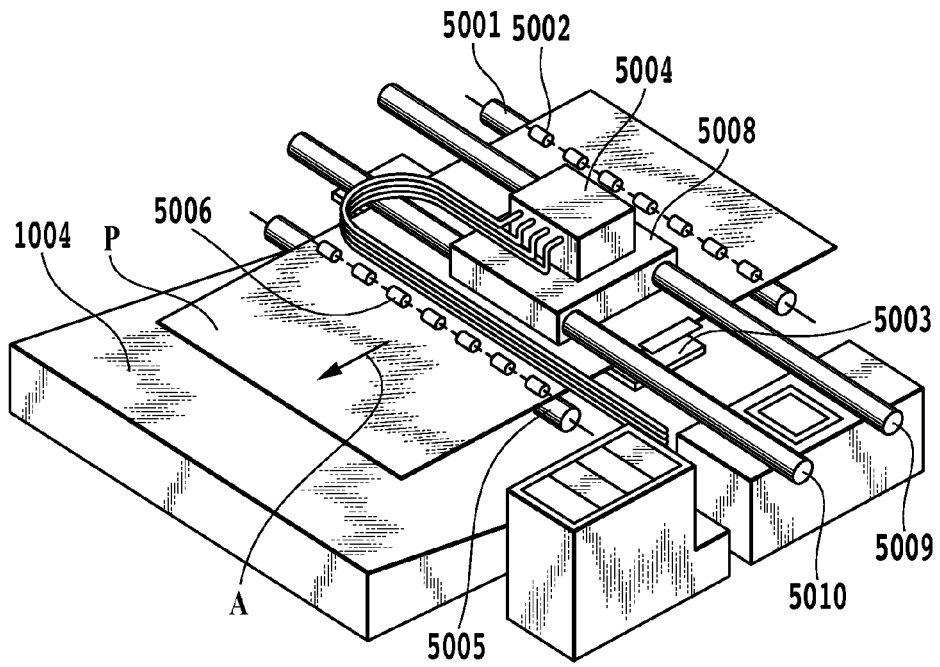

FIG. 2B is a perspective drawing that illustrates the printing unit of the printer engine unit of a serial-type inkjet printer of the embodiments of the present invention. The auto feed unit 1007 feeds printing medium P to the nip section of a conveying roller 5001 and pinch roller 5002 that follows it, which are located on the conveying path. After that, the printing medium P is conveyed by the rotation of the conveying roller 5001 in the direction of arrow A in the figure (sub scanning direction) while being supported and guided over the platen 5003. The pinch roller 5002 is elastically pressed against the conveying roller 5001 by a pressure unit such as a spring (not shown in the figure). The conveying roller 5001 and pinch roller 5002 are components of a first conveying unit on the up-line side in the conveying direction of the printing medium.

The platen 5003 is located at the printing position that faces a surface (ejection face) on which the discharge outlets of the inkjet type printing head 5004, and by supporting the rear surface of the printing medium P, the distance between the rear surface of the printing medium P and the ejection face is kept at a constant distance. The printing medium P that is conveyed over the platen 5003 and on which printing is performed is held between a rotating discharge roller 5005 and spurs 5006, which are rotating bodies that follow the discharge roller 5005, conveyed in the A direction and discharged to the paper discharge tray 1009 from the platen 5003. The discharge roller 5005 and spurs 5006 are components of a second conveying unit that is located down-line in the conveying direction of the printing medium.

The printing head 5009, with the ejection face facing the platen 5003 and printing medium P, is mounted in a carriage 5008 such that it is removable. The carriage 5008 is driven back and forth by the driving force of a carriage motor E0001 along two guide rails 5009 and 5010, and while moving, the printing head 5004 executes the ink discharge operation according to a print signal. The direction that the carriage 5008 moves in is the direction that crosses the direction (direction of arrow A) in which the printing medium is conveyed, and is called the main scanning direction. On the other hand, the conveying direction of the printing medium is called the sub scanning direction. Printing is performed on the printing medium P by alternately repeating the main scan by the carriage 5008 and printing head 5004 (movement that accompanies printing) and conveying of the printing medium (sub scan).

Figure 11A:
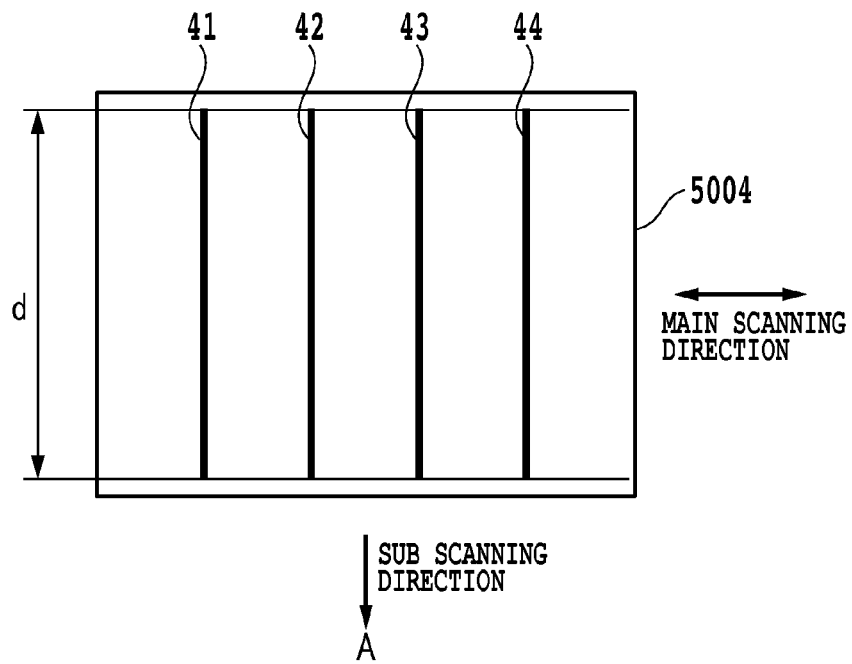
FIGS. 11A and 11B are diagrams for explaining the discharge outlet array state of a printing head that can be applied to embodiments of the invention.

FIG. 11A is diagrams illustrating the case in which the printing head 5004 used in the embodiments is observed from the discharge outlet formation surface. In the figure, 41 is a Cyan nozzle array (print element group), 92 is a Magenta nozzle array, 43 is a Yellow nozzle array and 44 is a Black nozzle array. The width in the sub scanning direction of each nozzle array is d, and printing having a width d is possible in one scan.

Each of the nozzle arrays 41 to 44 is such that a plurality of nozzles that discharge ink drops is arranged in the sub scanning direction at intervals of 600 dpi (dots/inch), or in other words, approximately 42 µm. Each individual nozzle comprises a discharge outlet that is the outlet when discharging ink, an ink path for directing the ink to the discharge outlet, and electrothermal conversion element that causes film boiling to occur in the ink near the discharge outlet. With this kind of construction, by applying a voltage pulse to the individual electrothermal conversion elements according to a discharge signal, film boiling occurs in the ink near the electrothermal conversion elements, and an amount of ink corresponding to the growth of generated bubbles becomes a suitable amount of liquid droplets and is discharged from each of the discharge outlets.

The printing apparatus of this embodiment is able to execute multipass printing, so that in the area that can be printed during one printing scan by the printing head 5004, an image is gradually formed by performing printing scanning a plurality of times. When doing this, by performing the conveying operation an amount smaller than the width of the printing head 5004 between each printing scan, density unevenness or stripes due to variation in each individual nozzle can be reduced.

Embodiment 1

Figure 1:
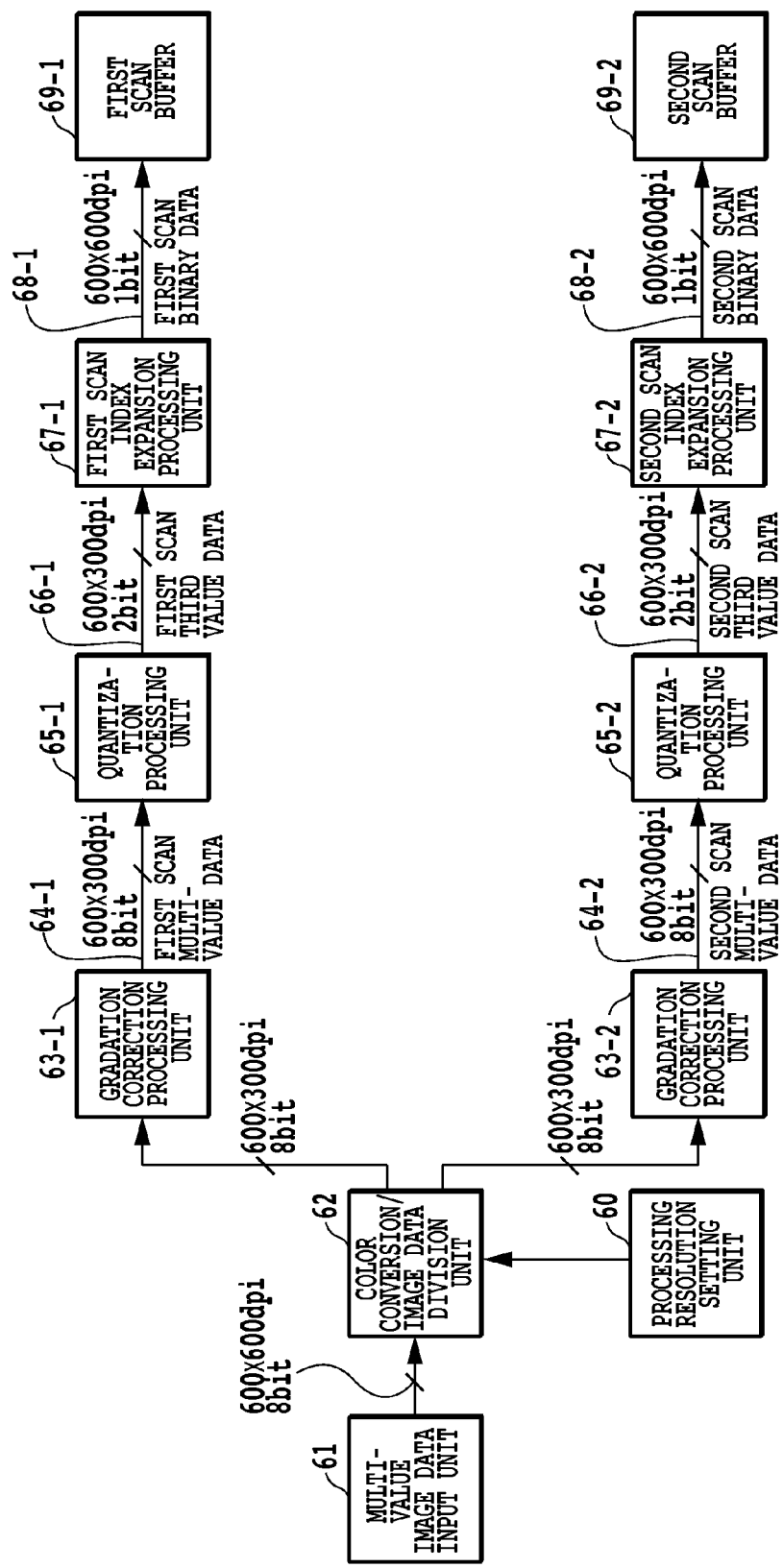
FIG. 1 is a block diagram for explaining the steps of image processing of a first embodiment when completing an image in the same area of a printing medium by 2-pass multipass printing.

FIG. 1 is a block diagram for explaining the steps of the image processing of an embodiment in which an image is completed in the same area of a printing medium by using 2-pass multipass printing. In this embodiment, the control unit 3000 comprises a multi-value image data input unit (61), color conversion/image data division unit (62), processing resolution setting unit (60), gradation correction processing units (63-1, 63-2), and quantization processing units (65-1, 65-2).

In this embodiment, the RGB multi-value image data that is input to the multi-value image data input unit 61 from an external device is taken to be image data in which individual pixel for each color are expressed in 8 bits (256 values) and have a resolution of 600 dpi×600 dpi. In addition, the color conversion/image data division unit 62 converts this input image data (256-value RGB data) to 2 groups of multi-value image data (256-value density data) that corresponds to the ink color (CMYK). In this embodiment, construction is such that the resolution of the density data from the color conversion/image data division unit 62 is adjusted according to the resolution set by the processing resolution setting unit 60. For example, when the processing resolution setting unit 60 designates a resolution of 600 dpi×300 dpi, the color conversion/image data division unit 62 outputs two groups of 256-value density data corresponding to the ink color (CMYK) at a resolution of 600 dpi×300 dpi.

Continuing, in the gradation correction processing units (63-1, 63-2) and quantization processing units (65-1, 65-2), image process is performed at 600 dpi×300 dpi. Therefore, in each processing unit, the number of pixels to be processed is reduced by half compared with when performing processing at 600 dpi×600 dpi. However, due to the division process, the object of processing is doubled to two planes, so as a result, the number of times that processing is performed is the same as the conventional method in which the division process was not performed (method of Japanese Patent Laid-Open No. 2000-103088) is not employed), so it is possible to avoid the new problem that was explained in the section of background of the invention. In FIG. 1, an example is given in which the processing resolution setting unit 60 designates a resolution of 600 dpi×300 dpi, however; the resolution of the multi-value density data that is output from the color conversion/image data division unit 62 can be set case by case.

This kind of resolution conversion process by the color conversion/image data division unit 62 is possible by performing an averaging process according to the resolution designated by the processing resolution setting unit 60. For example, when the designated resolution is 600 dpi×300 dpi as in this example, the color conversion/image data division unit 62 first calculates the average value of input image data (RGB) of two adjacent pixels in the vertical direction (sub scanning direction) among the pixels arranged 600 dpi×600 dpi. Then by referencing a 3-dimensional lookup table (LUT) that is prepared in advance, it is possible to obtain multi-value data (CMYK) for the first printing scan, and multi-value data (CMYK) for the second printing scan.

In a different method, it is possible to reference a 3-dimensional LUT for a 600 dpi×600 dpi as is, and to first obtain multi-value data (CMYK) for the first printing scan, and multi-value data (CMYK) for the second printing scan having a 600 dpi×600 dpi resolution. In this case, by calculating the average value of two adjacent pixels in the vertical direction of the 600 dpi×600 dpi CMYK values obtained in that way, it is possible to obtain the 600 dpi×300 dpi multi-value data for the first printing scan and for the second printing scan. In either case, it is possible to use the same 3-dimensional LUT regardless of the resolution that was designated by the processing resolution setting unit 60.

The processing after the gradation correction processing is performed independently and simultaneously for each color CMYK, so the following explanation will be for just one gradation color (for example, black). The 600 dpi×300 dpi multi-value data that was generated by the color conversion/image data division unit 62 is sent to the respective gradation correction processing unit 63-1 and 63-2, where gradation correction processing is performed using a 1-dimensional LUT. As a result, 600 dpi×300 dpi multi-value data 64-1 for the first scan is output from the gradation correction processing unit 63-1, and 600 dpi×300 dpi multi-value data 64-2 for the second scan is output from the gradation correction processing unit 63-2.

The multi-value data 64-1 for the first scan and the multi-value data 64-2 for the second scan further undergo quantization processing by the quantization processing units 65-1 and 65-2. In the quantization processing unit 65-1 of this embodiment, the 600 dpi×300 dpi multi-value data 64-1 for the first scan that is represented by 8-bit 256 values is converted to 600 dpi×300 dpi quantized (3-value) data 66-1 for the first scan that is represented by 2-bit 3 values. In the quantization processing unit 65-2 of this embodiment, the 600 dpi×300 dpi multi-value data 64-2 for the second scan that is represented by 8-bit 256 values is converted to 600 dpi×300 dpi quantized (3-value) data 66-2 for the second scan that is represented by 2-bit 3 values. The quantization method that is employed by these two quantization processing units 65-1 and 65-2 is a typical multi-value (3-value) error diffusion method.

When doing this, a certain number of locations of overlapping dots that are printed during two scans occurs, so in two error diffusion processes, it is preferred that different diffusion matrices be used. For example, in the quantization processing unit 65-1, the diffusion matrix illustrated in FIG. 7A can be used, and in the quantization processing unit 66-2, the diffusion matrix illustrated in FIG. 7B can be used.

After 3-value image data 66-1 and 66-2 are obtained from the quantization processing units 65-1 and 65-2, the data are sent to the printer engine 3004 illustrated in FIG. 3 via an IEEE 1284 bus 3022. The following processing is executed by the printer engine 3004.

In the printer engine 3004, the 3-value data 66-1 for the first scan undergoes processing by the first scan index expansion processing unit 67-1 and is converted to 600 dpi×600 dpi 2-value data 68-1 for the first scan that is expressed by 1-bit 2 values. In addition, the 3-value data 66-2 for the second scan undergoes processing by the second scan dot arrangement pattern processing unit 67-2 and is converted to 600 dpi×600 dpi 2-value data 68-2 for the second scan that is expressed by 1-bit 2 values.

Figure 12:
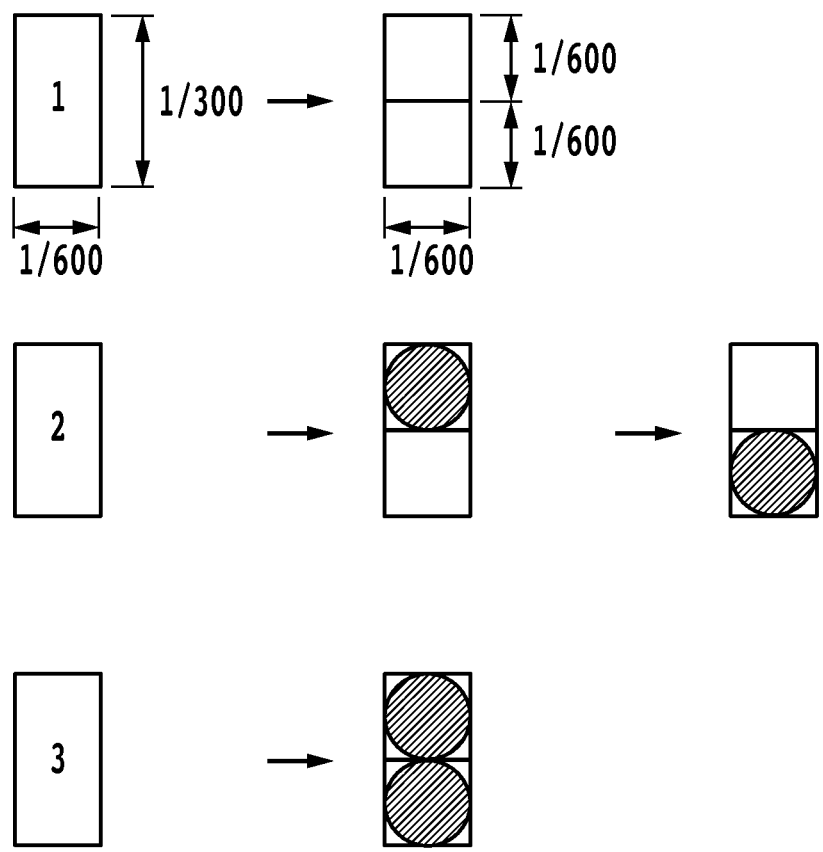
FIG. 12 is a schematic diagram for explaining the dot arrangement pattern and data conversion method.

FIG. 12 is a schematic diagram for explaining the dot arrangement pattern referenced by the index expansion processing unit 67-1 and 67-2 and data conversion methods. The left side of the figure illustrates a pixel having a 3-value level that is input to the index expansion processing unit 67-1 or 67-2, and has one of levels 0 to 2. On the other hand, the right side of the figure illustrates a dot arrangement pattern that is selected to correspond to the respective level. Each pixel corresponds to two 600 dpi×600 dpi sub pixels, and one dot can be printed per one sub pixel.

As illustrated in the figure, when the input level is 0, a dot pattern is selected in which no dots are printed in either of the two sub pixels. In other words, 600 dpi×300 dpi input data having level 0 is converted to two 600 dpi×600 dpi output data (level 0 and level 0). When the input level is 1, a dot arrangement pattern is selected in which a dot is printed in one of the two sub pixels and no dot is printed in the other. In other words, 600 dpi×300 dpi input data having level 1 is converted to two 600 dpi×600 dpi output data (level 1 and level 0, or level 0 and level 1). Furthermore, when the input level is 2, a dot arrangement pattern is selected in which a dot is printed in both sub pixels. In other words, 600 dpi×300 dpi input data having level 2 is converted to two 600 dpi×600 dpi output data (level 1 and level 1).

Here, focusing in on one 600 dpi×600 dpi pixel (on sub pixel), no black dots are printed in the sub pixel wherein the binary data 68-1 for the first scan and the binary data 68-2 for the second scan are both level 0. Moreover, only one black dot is printed in the sub pixel wherein one of the binary data 68-1 for the first scan and the binary data 68-2 for the second scan is level 0 and the other is level 1. Furthermore, two black dots are overlapped and printed in the sub pixel wherein binary data 68-1 for the first scan and the binary data 68-2 for the second scan are both level 1.

After that, the binary data 68-1 for the first scan is stored in the buffer 69-1 for the first scan, and printed in the first scan by the nozzle array 44 (black nozzle array) in a unit area. Also, the binary data 68-2 for the second scan is stored in the buffer 69-2 for the second scan, and printed in the second scan by the nozzle array 44 (black nozzle array) in the unit area. The image that is printed has a resolution of 600 dpi×600 dpi.

Figure 18:
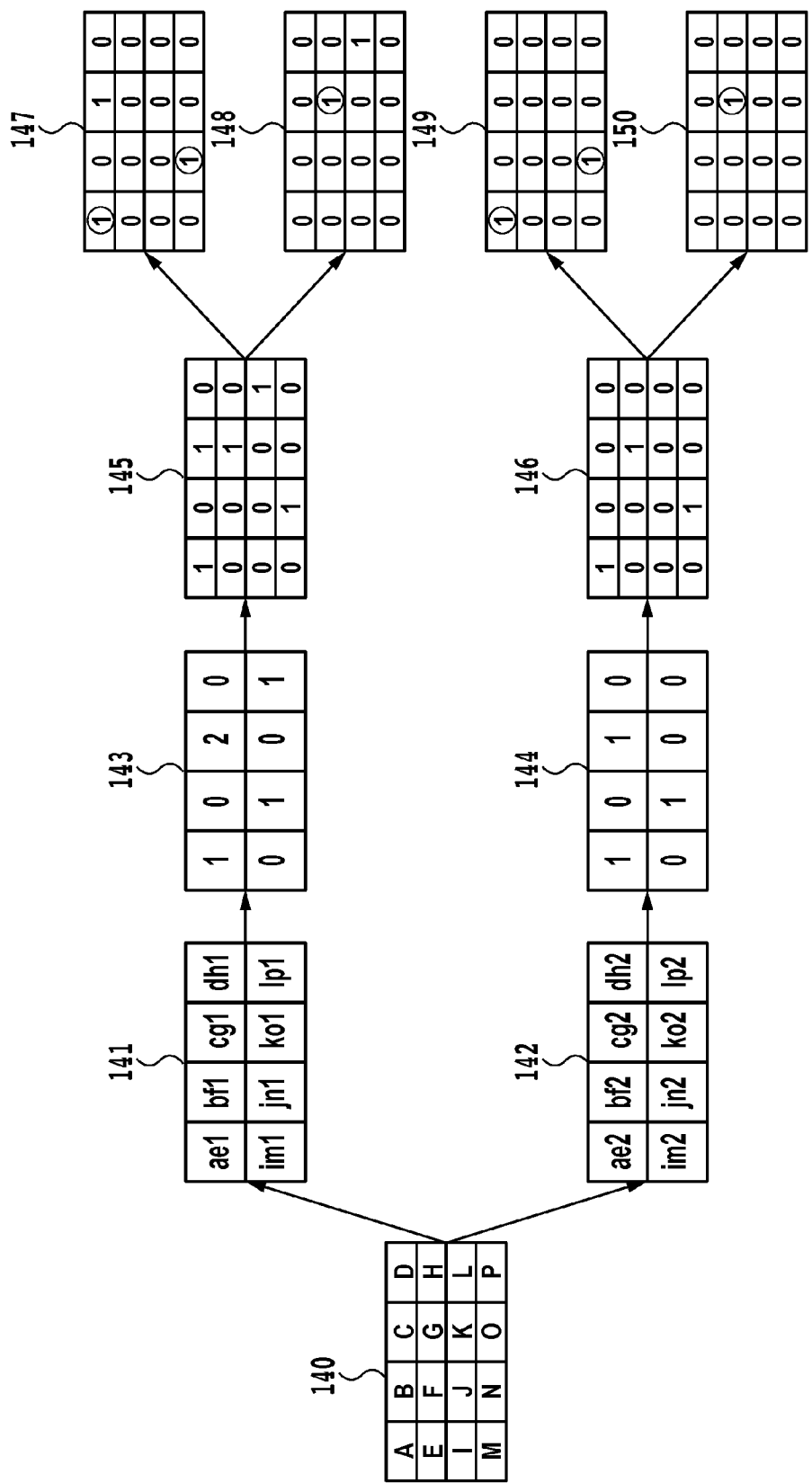
FIG. 18 is a diagram of a detailed example of the image processing illustrated in FIG. 1.

The image processing explained in FIG. 1 is explained in more detail using FIG. 18. FIG. 18 is an image of a detailed example of the image processing illustrated in FIG. 1. Here, for a resolution of 600 dpi×600 dpi, the case of processing image data 140 that corresponds to 4 pixels×4 pixels for a total of 16 pixels is correlated with FIG. 1 and explained. Reference codes A to P represent combinations of RGB values of image data 140 that corresponds to each of the 600 dpi×600 dpi pixels. In addition, reference codes ae1 to 1$p$1 represent combinations of CMYK values of multi-value data 141 for the first scan that corresponds to each of the 600 dpi×300 dpi pixels, and reference codes ae2 to 1$p$2 represent combinations of CMYK values of multi-value data 142 for the second scan that corresponds to each of the 600 dpi×300 dpi pixels.

In FIG. 18, the multi-value data 140 corresponds to the multi-value RGB data that is input to the color conversion/image data division unit 62. The multi-value data 141 corresponds to the multi-value data 64-1 for the first scan as illustrated in FIG. 1, and multi-value data 142 corresponds to the multi-value data 64-2 for the second scan. Moreover, the data 143 after quantization (conversion to three values) for the first scan corresponds to the quantized data 66-1 for the first scan, and the data 144 after quantization (conversion to three values) for the second scan corresponds to the quantized data 66-2 for the second scan. Furthermore, the binary data 145 corresponds to the binary data 68-1 for the first scan, and the binary data 146 corresponds to the binary data 68-2 for the second scan.

The following explanation will be in order of processing. First, the color conversion/image division unit 62 converts the 600 dpi×600 dpi input image data 140 (RGB) to multi-value data 141 (CMYK) for the first scan and multi-value data 142 (CMYK) for the second scan, each having a resolution designated by the processing resolution setting unit 60. In this embodiment, the processing resolution setting unit 60 designates a resolution of 600 dpi×300 dpi, so the multi-value data 141 for the first scan and the multi-value data 142 for the second scan have a resolution of 600 dpi×300 dpi.

When doing this, the color conversion/image data division unit 62 calculates the average value of the input image data (RGB) among a plurality of pixels corresponding to the resolution designated by the processing resolution setting unit 60. Here, when the designated resolution is 600 dpi×300 dpi as in this embodiment, the color conversion/image data division unit 62 calculates the average value of input image data (RGB) among two adjacent pixels in the vertical direction (sub scanning direction) in the pixels arranged 600 dpi×600 dpi. In other words, in the case of the image data 190 at the upper left in FIG. 18, the average value Ave (A, E) of A and E is calculated for each of the three values RGB. After that, by referencing a 3-dimensional LUT that is prepared in advance, the color conversion/image data division unit 62 converts the data to four values (CMYK) that correspond to these three values (RGB), or in other words, converts the data to multi-value data (ae1) for the first scan and multi-value data (ae2) for the second scan.

Moreover, as a different method, a 3-dimensional LUT is referenced for a 600 dpi×600 dpi resolution as is, and (CMYK) having a 600 dpi×600 dpi resolution can be converted first to two divisions. In this case, for the two groups of obtained 600 dpi×600 dpi CMYK values, the average value is calculated among a plurality of pixels corresponding to the designated resolution and taken to be the multi-value data for the first scan (ae1) and the multi-value data for the second scan (ae2). In other words, the averaging process based on the resolution designated by the processing resolution setting unit 60 can be performed before the color conversion process of converting from RGB to CMYK, or can be performed after the color conversion process.

The following processing is performed independently and simultaneously for each color CMYK, so for convenience, the following explanation will be for only one color (for example, black (K)), and an explanation of the other colors will be omitted.

The multi-value data (141) for the first scan is input to the quantization processing unit 65-1 where it undergoes multi-value error-diffusion processing and is converted to quantized data (143) for the first scan. Moreover, the multi-value data (142) for the second scan is input to the quantization processing unit 65-2 where it undergoes multi-value error-diffusion processing and is converted to quantized data (144) for the second scan. When doing this, error-diffusion processing is performed by the quantization processing unit 65-1 using the error-diffusion matrix A illustrated in FIG. 7A, and error-diffusion processing is performed by the quantization processing unit 65-2 using the error-diffusion matrix B illustrated in FIG. 7B. In the case of this embodiment, the quantized data 143 and 144 that is obtained in this way has resolution of 600 dpi×300 dpi, and each pixel is expressed by three values, 0 to 2.

After that, the quantized data 143 undergoes first scan index expansion processing and is converted to binary data (145) for the first scan. Quantized data 144 also undergoes second scan index expansion processing and is converted to binary data (146) for the second scan. More specifically, by referencing the dot arrangement pattern explained using FIG. 12, 600 dpi×300 dpi 3-value data that is expressed by 0 to 2 is converted to 600 dpi×600 dpi binary data.

For examples of binary data 145 and 146, the data of each pixel that is "1" is data for which a dot is printed (ink is discharged), and data that is "0" is data for which a dot is not printed (no ink is discharged). In other words, in binary data 145, for a sub pixel that is "1", a dot is printed in the first printing scan, and in binary data 146, for a sub pixel that is "1", a dot is printed in the second printing scan. By doing so, for a sub pixel that is "1" and surrounded by a circle, a dot is printed in the first printing scan and second printing scan such that the dots overlap, and for a sub pixel that is "1" and is not surrounded by a circle, a dot is printed in either the first printing scan or second printing scan, and dots are not overlapped. Therefore, it is possible to have overlapping dots and non-overlapping dots suitably coexist in the image, so it is possible to suppress density fluctuation even when there is deviation in the printing position between the first scan and second scan.

As explained above, with this embodiment, by dividing multi-value image data into data for a first scan and second scan and performing quantization processing, non-overlapping dots and overlapping dots are suitably mixed, and it becomes possible to output an image for which density fluctuation and density unevenness has been suppressed. In addition, when doing this, by making the resolution before quantization processing temporarily lower than the input multi-value data, the number of pixels that become the object of the quantization processing (or in other words, the number of times quantization is performed) can be kept from being increased more than necessary. That is, with this embodiment, in a series of image processing, it is possible to output a high quality image for which density fluctuation has been suppressed and with a decrease in processing speed. Furthermore, by taking the quantization process above to be multi-value quantization processing, and used together with dot arrangement pattern processing, the printing resolution can be equivalently returned to the input resolution, with no drop in the resolution.

An example of 2-pass multi-pass printing has been explained above, however, it is also possible of course for this embodiment to correspond to an even larger number of passes. In this case, the color conversion/image data division unit 62 divides the image data that has been converted to low resolution into M number of planes that correspond to M number of multipasses, and quantization processing is executed for each of the M number of planes.

However, the method of performing the quantization process after dividing the data into a plurality of planes as in Japanese Patent Laid-Open No. 2000-103088 and the present invention is particularly effective in reducing density unevenness in multipass printing having a small number of passes (low-pass printing) such as two passes as described above. That is because the lower the number of passes, the fewer number of planes there are in which printing is performed over the same area, and deviation of the printing position of one plane has a large effect on the image density. On the other hand, in multipass printing with a large number of passes, there is a large number of planes in which printing is performed over the same area, so even though deviation of the printing position occurs in one or two planes, there is not so much of an effect on the image density, and density unevenness due to deviation of the printing position is not as much of a problem as in low-pass printing.

Moreover, in low-pass printing, high-speed image output is often desired, so that this embodiment, in which the processing load of quantization is reduced, is able to have an effect on both the reduction of density unevenness and an improvement of processing speed in low-pass printing. On the other hand, in many pass-printing in which high-quality image output is often desired, there is a possibility that image quality will decrease due to the process described above for lowering the resolution. In the process for lowering the resolution, the original detailed image information of the pixels is lost due to unification of the multi-value data of a plurality of adjacent pixels, so after that, even when returning to the original resolution in the index expansion process, the lost information does not completely return.

Therefore, in consideration of the characteristics of the image processing of this embodiment described above, a plurality of printing modes having different number of multipasses are prepared for the printer of this embodiment, and using a different image processing method depending on the set printing mode is effective. For example, when the printer is set to the high-speed mode (first mode), after the process for lowering the resolution and the division process for dividing the data into M planes, quantization processing is performed for each plane to generate first quantized data. After that, an image is printed by M number (M is an integer 2 or greater) of relative movements (M-pass printing) according to the M number of first quantized data. On the other hand, when the printer is set to the high-quality mode (second mode), the input image data is binarized as is using the conventional method and the and second quantized data are generated without performing the resolution reduction process and division process. This second quantized data is divided into N number of data using a mask pattern that is used in a conventional method, and an image is printed by N number (N>M) of relative movements (N-pass printing). By doing so it is possible to obtain both high-speed output with no density unevenness by using low-pass printing (M-pass printing), and output a high-quality image by using many-pass printing (N-pass printing).

In addition, when the printer is set to the high-quality mode (second mode), it is possible to divide the input image data into M planes without processing for lowering the resolution. That is, after dividing the input image data into M planes without processing for lowering the resolution the error diffusion processing is executed for each of the M number of planes to generate binary data. By doing this, an effects of the density fluctuation can be reduced in the high-quality mode (second mode).

Embodiment 2

Figure 8A:
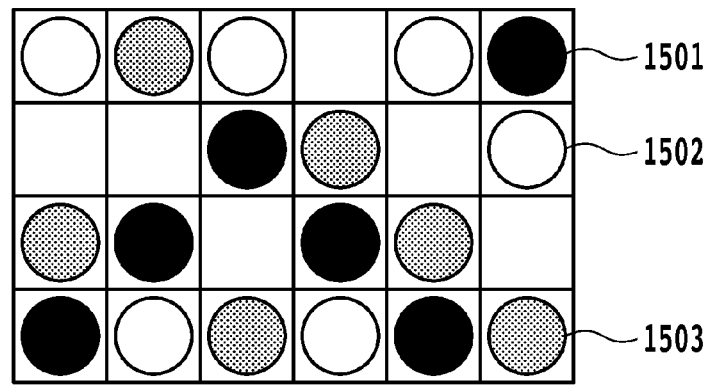
FIGS. 8A to 8C are diagrams for explaining the relationship between the dot overlap state or the dot dispersion state and graininess.
Figure 8B:
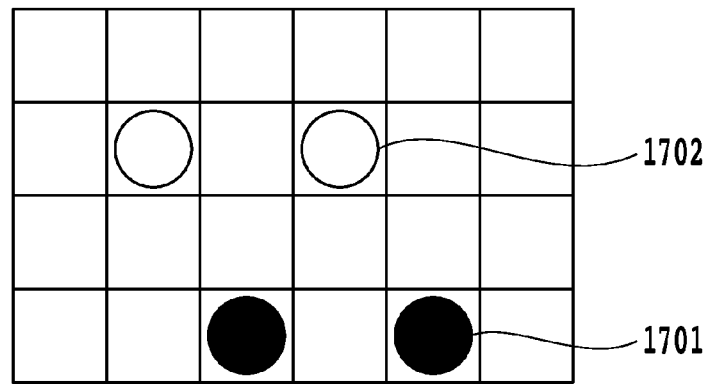

In the following, a second embodiment of the present invention will be explained. Generally, in a highlighted portion where graininess is noticeable, it is preferred to evenly disperse the few number of dots (1701, 1702) such that they have a fixed distance between them as illustrated in FIG. 8B. Moreover, in high-density portion where the highest density values are important, it is preferred that dots be filled in to an extent that there are no exposed areas of blank paper. In other words, it is desired that the ratio of areas of overlapping dots (dot overlap rate) be adjusted with good balance within a range such that density unevenness, graininess and insufficient density of the output image are not a problem.

However, in the method disclosed in Japanese Patent Laid-Open No. 2000-103088, quantization processing is performed for each plane without any correlation among the plurality of planes, and the dot overlap rate is set such that it depends on the quantization processing method used. In other words, in the method disclosed in Japanese Patent Laid-Open No. 2000-103088, it was possible to set the dot overlap rate such that it was not 0, however; it was not possible to adjust the dot overlap rate within a desired range.

Figure 8C:
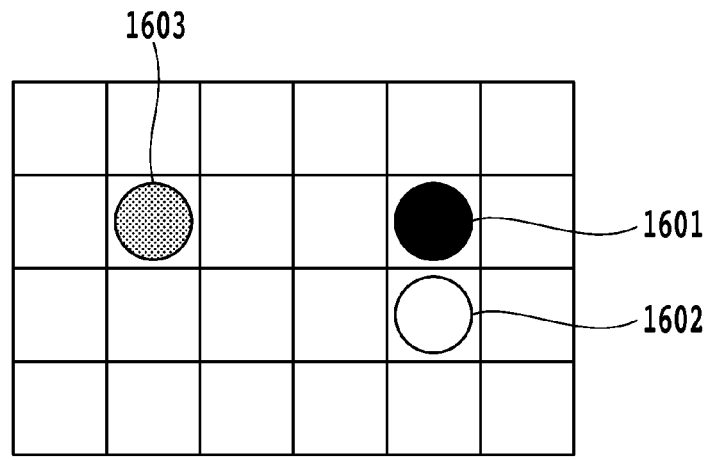

For example, in the construction disclosed in Japanese Patent Laid-Open No. 2000-103088, locations (1603) where dots overlap, and adjacent printed locations (1601, 1602) occur here and there as illustrated in FIG. 8C, so clumps of these dots stand out and cause graininess to become worse. In addition, in high-density areas where maximum density values are important, blank areas may become exposed due to overlapping of dots, and this may cause insufficient density. As a result, it is difficult to output an image at high speed in which there is no problem with density unevenness, graininess and insufficient density in any of the density portions.

In order that this embodiment can handle new problems such as this in addition to the problems that the invention is to solve as explained above, an image processor that is constructed in order to more actively adjust the dot overlap rate of dots that are printed by different planes (printing scanning) is explained.

Here, the term "dot overlap rate' as used in this specification will be explained. "Dot overlap", as illustrated in FIGS. 4A to 4H and FIG. 10, is the ratio of the number of dots (overlapping dots) that are to be printed in the same location by different printing scans or different printing element groups to the total number of dots to be printed per unit area of K (K is an integer 1 or greater) number of pixels. The same location in the case of FIGS. 9A to 4G is the same pixel location, and in the case of FIG. 10 is the sub pixel location.

Using FIGS. 4A to 4H, the dot overlap rate for a first plane and second plane that correspond to a unit area comprising 4 pixels (main scanning direction)×3 pixels (sub scanning direction) is explained. The "first plane" is a collection of binary data that correspond to the first scan or first nozzle group, and the "second plane" is a collection of binary data that correspond to the second scan or second nozzle group. Moreover, "1" represents data that indicates that a dot will be printed, and "0" represents data that indicates that a dot will not be printed.

In FIGS. 4A to 4E, the number of "1s" in the first plane is "4" and the number of "1s" in the second plane is also "4", so the total number of dots to be printed in a unit area comprising 4 pixels×3 pixels is "8". On the other hand, the number of "1s" in the first plane and second plane that correspond to the same pixel location is the number of dots (overlapping dots) that is printed in the same pixel such that they overlap. According to this definition, the number of overlapping dots in the case of FIG. 4A is "0", in the case of FIG. 4B is "2", in the case of FIG. 4C is "4", in the case of FIG. 4D is "6" and in the case of FIG. 4E is "8". Therefore, as illustrated in FIG. 4H, the dot overlap rates in FIGS. 4A to 4E are, 0%, 25%, 50%, 75% and 100%, respectively.

Furthermore, FIGS. 4F and 4G illustrate cases in which the number of printed dots in a plane and number of total dots differ from the cases of FIGS. 4A to 4E. FIG. 4F illustrates the case in which the number of dots printed in the first plane is "4", the number of dots printed in the second plane is "3", the total number of dots is "7", the number of overlapping dots is "6" and the dot overlap rate is 86%. On the other hand, FIG. 4G illustrates the case in which the number of dots printed in the first plane is "4", the number of dots printed in the second plane is "2", the total number of dots is "6", the number of overlapping dots is "2 and the dot overlap rate 33%.

In this way, the term "dot overlap rate" in this specification is the overlap rate of dot data when dot data corresponding to different scans or different printing element groups overlap virtually.

Figure 11B:
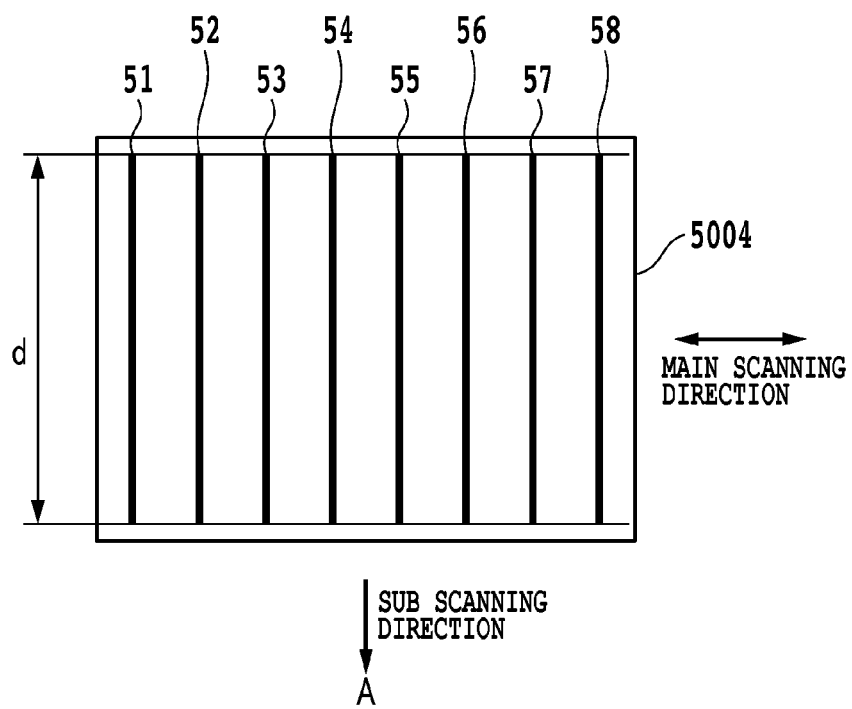

The image processing method of the present invention for controlling the dot overlap rate is explained in detail. In this embodiment, as illustrated in FIG. 11B, a printing head 5004 is used that comprises two nozzle arrays (print element groups) for each color. In the figure, 51 and 58 are cyan nozzle arrays, 52 and 57 are magenta nozzle arrays, 53 and 56 are yellow nozzle arrays and 54 and 55 are black nozzle arrays. By arranging the nozzle arrays for each color such that they are symmetric in the main scanning direction as in this example, it is possible to fix the order of ink application to the print medium of the printing scan in the forward direction and of the printing scan in the backward direction. In this embodiment, 2-pass multipass printing is executed using two nozzle arrays for one color such as this.

Figure 14A:
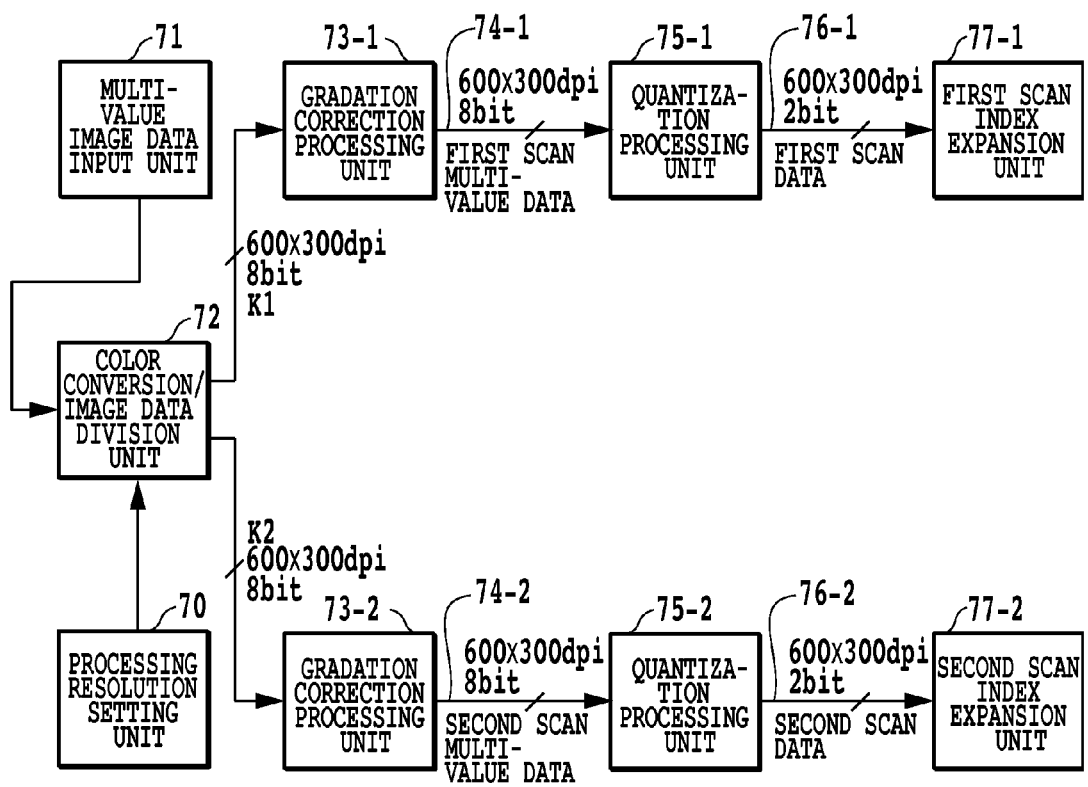
FIG. 14A and FIG. 14B are block diagrams for explaining the steps of image processing that is executed in a second embodiment.
Figure 14B:
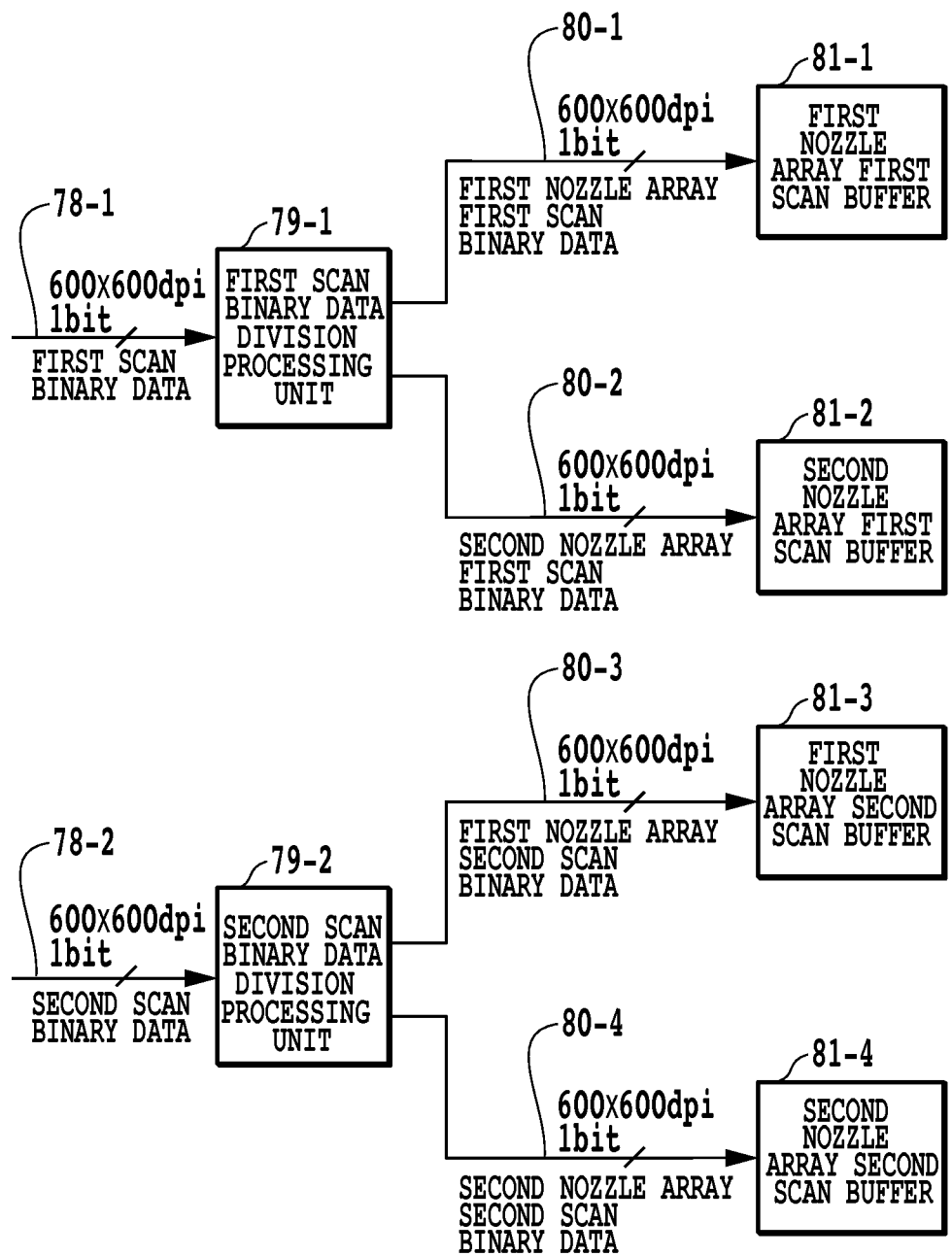

FIG. 14 is a block diagram for explaining the steps of the image processing that is executed in this embodiment. In this embodiment as well, RGB multi-value image data that is input from an external device to the multi-value image data input unit 71 is such that individual pixels for each color is expressed by 8-bit (256 values) and has a 600 dpi×600 dpi resolution. In addition, the color conversion/image data division unit 72 converts this input image data (256-value RGB data) to two sets of multi-value image data (256-value density data) that correspond to the ink colors (CMYK). However, in the color conversion/image data division unit 72, with bias being applied according to a specified distribution rate, the image data is divided into image data for the first scan and image data for the second scan. A feature of this embodiment is controlling the dot overlap rate by adjusting the distribution rate of the color conversion/image data division unit 72 in this way. The relationship between the distribution rate and dot overlap rate will be explained in detail later.

In this embodiment as well, the processing resolution setting unit 71 sets the resolution of the image data after division by the color conversion/image data division unit 72. For example, when the processing resolution setting unit 70 designates a resolution of 600 dpi×300 dpi, the color conversion/image data division unit 62 output two groups of 256-value density data that corresponds to the ink colors (CMYK) according to a specified distribution rate and with a resolution of 600 dpi×300 dpi. As a result of performing this kind of process, it is possible to complete the gradation correction process and quantization process by performing processing the same number of times as the conventional method in which the division process is not performed (the method disclosed in Japanese Patent Laid-Open No. 2000-103088 is not employed) the same as in the first embodiment.

The processing described below is performed independently and simultaneously for each of the colors CMYK, so the following explanation will be for just the color black (K). In the color conversion/image data division unit 72, multi-value data for the first scan and multi-value data for the second scan that are generated according to a specified distribution rate undergo a gradation correction process as in the first embodiment by the gradation correction units 73-1 and 73-2, respectively. After that, as in the first embodiment, the quantization processing units (75-1 and 75-2) perform quantization processing and send the data to the printer engine 3004 via an IEEE 1284 bus 3022. The printer engine 3004, then executes the following processing.

In the printer engine 3004, 3-value data 76-1 for the first scan, and 3-value data 76-2 for the second scan undergo index expansion processing as in the first embodiment explained in FIG. 12. By this processing, the 3-value data 76-1 and 76-2 are converted to 600 dpi×600 dpi binary data 78-1 and 78-2 that is expressed by two values of 1-bit.

After that, the binary data 78-1 is input to the first scan binary data division processing unit 79-1 and divided into binary data 80-1 for the first nozzle array in the first scan, and binary data 80-2 for the second nozzle array in the first scan. Moreover, the binary data 78-2 is input to the second scan binary data division processing unit 79-2 and divided into binary data 80-3 for the first nozzle array in the second scan, and binary data 80-4 for the second nozzle array in the second scan. In this embodiment, in the first scan binary data division processing unit 79-1 and second scan binary data division processing unit 79-2, the division processing is executed using masks that are stored in memory in advance. A mask is a collection of data which set permitting to print (1) or not permitting to print (0) for each binary image data of the 600 dpi×600 dpi pixels, and by performing a logical AND operation between the mask and the binary image data for each pixel the binary data is divided.

Figure 5:
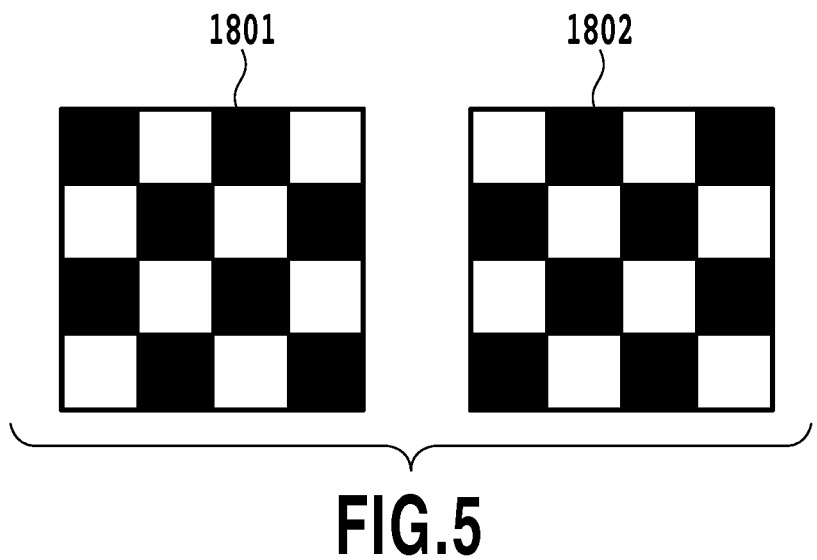
FIG. 5 is a diagram that illustrates one example of a mask that can be used in the present invention.

In the case where the binary image data are divide into N divisions, normally N number of masks are used, and in this embodiment where the binary image data are divided into two divisions, two masks 1801 and 1802 as illustrated in FIG. 5 are used. Here, mask 1801 is used for generating binary data for the first nozzle array, and mask 1802 is used for generating binary data for the second nozzle array. These two masks have a complementary relationship with each other, so the binary data that are divided using these masks will not overlap each other. Therefore, compared with the two planes that were divided out by the color conversion/image data division unit 72, a plane relationship occurs in which it is more difficult for graininess to become worse and for insufficient density to occur. In FIG. 5, the black areas are data (1: data for which the image data is not masked) for which printing image data is permitted, and white areas are data (0: data for which the image data is masked) for which printing image data is not permitted. In this embodiment, the same set of masks 1801 and 1802 are used by the first scan binary data division processing unit 79-1 and second scan binary data division processing unit 79-2. However, as long as the masks for the first nozzle array and second nozzle array have a complementary relationship with each other, it is also possible to use a different set of masks for the first scan and second scan.

After that, the binary data (80-1) for the first nozzle array in the first scan is stored in a buffer (81-1) for the first nozzle array in the first scan, and printed in a unit area in the first scan by nozzle array 54. The binary data (80-2) for the second nozzle array in the first scan is stored in a buffer (81-2) for the second nozzle array in the first scan, and printed in a unit area in the first scan by nozzle array 55. The binary data (80-3) for the first nozzle array in the second scan is stored in a buffer (81-3) for the first nozzle array in the second scan, and printed in a unit area in the second scan by nozzle array 54. Furthermore, the binary data (80-4) for the second nozzle array in the second scan is stored in a buffer (81-4) for the second nozzle array in the second scan, and printed in a unit area in the second scan by nozzle array 55. The printed image has a resolution of 600 dpi×600 dpi.

The method and effect of adjusting the distribution rate for controlling the dot overlap rate is explained below. Table 1 gives the distribution rates for the multi-value data for the first scan and second scan by the color conversion/image data division processing unit 72 of this embodiment, and dot overlap rates of the first scan and second scan when typical error diffusion processing is performed on the multi-value data.

The printing rate (%) in Table 1 corresponds to the number of dots of one color of ink that is printed per unit area, where 0% is the state in which no dots are printed per unit area, and 100% is the state in which the maximum number of dots is printed per unit area. Therefore, for example, a printing rate of 60% indicates a state in which the number of dots printed per unit area corresponds to a value (153) that is 60% the maximum value (255) of multi-value data K that is input to the color conversion/image data division unit 72. In Table 1, this printing rate is given in 10 levels from 0 to 100%.

Moreover, the distribution rate (%) is the ratio of the multi-value data set according to the printing rate that is distributed to the first scan (K1) and the second scan (K2), where the total distribution rate is 100%. For example, when distributing the multi-value data value (K=100) to multi-vale data (K1=80) for the first scan, and multi-value data (K2=20) for the second scan, the distribution rate is (K1:K2=80:20). In Table 1, this kind of distribution rate is given in 6 levels. The dot overlap rates, which are the result of quantization processing by the typical error-diffusion method and the index expansion process illustrated in FIG. 12, are given in each column corresponding to the distribution rate and printing rate.

TABLE 1

| Distribution rate (%) | | Printing rate (%) | | | | | | | | | |
|---|---|---|---|---|---|---|---|---|---|---|---|
| First scan | Second scan | 10 | 20 | 30 | 40 | 50 | 60 | 70 | 80 | 90 | 100 |
| 100 | 0 | 0 | 0 | 0 | 0 | 0 | 0 | 0 | 0 | 0 | 0 |
| 90 | 10 | 1.8 | 3.6 | 5.4 | 7.2 | 9 | 10.8 | 12.6 | 14.4 | 16.2 | 18 |
| 80 | 20 | 3.2 | 6.4 | 9.6 | 12.8 | 16 | 19.2 | 2.4 | 25.6 | 28.8 | 32 |
| 70 | 30 | 4.2 | 8.4 | 12.6 | 16.8 | 21 | 25.2 | 29.4 | 33.6 | 37.8 | 42 |
| 60 | 40 | 4.8 | 9.6 | 14.4 | 19.2 | 24 | 28.8 | 33.6 | 38.4 | 43.2 | 48 |
| 50 | 50 | 5 | 10 | 15 | 20 | 25 | 30 | 35 | 40 | 45 | 50 |

Figure 6:
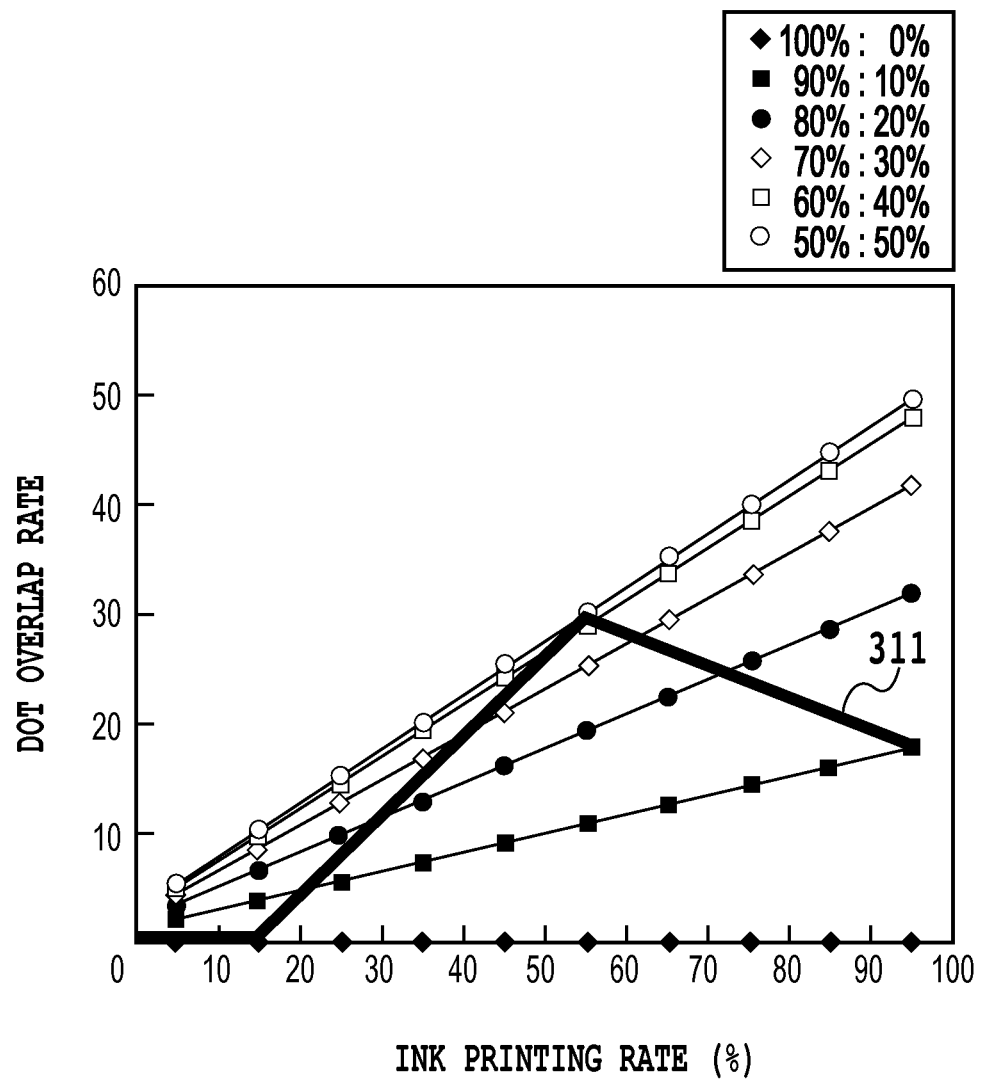
FIG. 6 is a diagram that illustrates the relationship between the distribution rate and dot overlap rate.

FIG. 6 is a diagram that illustrates Table 1 as a graph. The horizontal axis is the printing rate, the vertical axis is the dot overlap rate, and for each of the 6 levels of distribution rates illustrated in Table 1, the dot overlap rate with respect to the printing rate is expressed as a straight line with a different slope. For example, when the distribution rate for the first printing scan is 100% and the distribution rate for the second printing scan is 0%, all of the multi-value data is printed by just the first printing scan. In this case, there is no dot overlap, and even though the printing rate increases the dot overlap rate remains at 0%. As the distribution rate for the second printing scan gradually increases, the slope of the dot overlap rate with respect to the printing rate gradually increases. In addition, when both the distribution rate for the first printing scan and second printing scan is 50%, the slope of the dot overlap rate with respect to the printing rate becomes a maximum, and when the printing rate is 100%, the dot overlap rate becomes 50%. Therefore, by obtaining the relationship between the distribution rate and dot overlap rate in advance as illustrated in Table 1 and FIG. 6, it is possible to achieve the desired dot overlap rate by adjusting the distribution rate.

In FIG. 6, the thick line 311 illustrates the state in this embodiment of adjusting the dot overlap rate according to the printing rate (or in other words the total value of a plurality of multi-value density data corresponding to different scans). In this embodiment, in low-density portions where the printing rate is up to 20%, the dot overlap rate is 0%, in medium density portions where the printing rate is 20 to 60%, the dot overlap rate gradually increases to 30%, and in high-density portions where the printing rate is 60% or greater, the dot overlap rate gradually drops to 20% or less. In order to achieve this kind of dot overlap rate, the distribution rate at a printing rate of 0 to 20% is (100%:0%), and at a printing rate of 20 to 60%, the distribution rate is gradually changed until it becomes (50%:50%). In addition, at a printing rate of 60%, in order that the dot overlap rate becomes a maximum, the distribution rate is made to be (50%:50%). Moreover, in high-density areas where the printing rate is 60 to 100%, the distribution rate is gradually changed unit it becomes (90%: 10%). In this embodiment, the distribution rate is set in this way such that the dot overlap rate in medium-density portions, where density unevenness due to density fluctuation caused by deviation of the printing position is considered to be the most important, is higher than in low-density portions and high-density portions. In order to suppress the occurrence of pseudo contours, it is preferred that adjustment of the distribution rate be changed as smoothly as possible with respect to change in the printing rate.

Incidentally, in this embodiment, the color conversion/image data division unit 62 converts all of the input image data (RGB) together to a plurality of multi-value density data corresponding to the printing scans, so parameters such as those that correspond to the "printing rates" illustrated in Table 1 and FIG. 6 are not actually used. However, there is a correlation between the total value of multi-value data for the first printing scan and multi-value data for the second printing scan after distribution and the printing rate, and when this total value becomes large, the printing rate after binarization becomes large. In other words, the total value of a plurality of multi-value density data that corresponds to different scans corresponds to the "printing rate". Therefore, in actual processing, RGB coordinates can be correlated with CMYK values in a 3-dimensional LUT so that the multi-value data at the coordinates where the total value of multi-value data for each printing scan corresponds to a printing rate of 60% is distributed for each printing scans at the distribution rate of (50:50). In other words, in this embodiment, the color conversion/image data division unit 72 performs data conversion by using a LUT table in which the RGB coordinates are correlated with CMYK multi-value data so that the relationship between the total value of multi-value data for each printing scan (printing rate) and the distribution rate satisfies the graph indicated by the thick line in FIG. 6. By doing so, it is possible to set the dot overlap rate for medium-density portions, where density unevenness is considered to be the greatest, higher than low-density portions and high-density portions, and for all density portions where the priority between density unevenness and graininess changes, it is possible to output a good image.

Also, in this embodiment, as in the first embodiment, the color conversion/image data division unit 72 does not have to convert all of the multi-value brightness data (RGB) to a plurality of multi-value density data (CMYK) at once. The process for converting color from RGB to CMYK can be provided separately from the process of converting CMYK data to a plurality of multi-value density data that corresponds to printing. In that case, a plurality of multi-value density data can be generated according to the distribution rate that is set according to the multi-value data after color conversion, or in other words, according to Table 1.

The process for lowering the resolution, as in the first embodiment, can be performed in any stage as long as it is performed before the quantization process. In other words, the color conversion process for converting RGB to CMYK can be performed in the RGB stage after calculating the average value of multi-value data among a plurality of adjacent pixels, and the process for lowering the resolution can be performed after the color conversion process.

In Table 1, the color conversion/image data division unit 72 sets the distribution rates such that the sum of the distributions rates for the first printing scan and second printing scan becomes 100%, however; this embodiment is not limited to this. With the convenience of the image processing or the object of improving the absolute density, the sum of the distribution rate for the first printing scan and the distribution rate for the second printing scan can be greater than 100%, or may be less than 100%.

With the embodiment explained above, by performing quantization processing after dividing multi-value density data for a first printing scan and second printing scan according to a suitable distribution rate, it is possible to set the dot overlap rate in density portions where density unevenness is considered to be more of a problem higher than in other portions. When doing this, by making the resolution after division lower than that of the input multi-value density data, it is possible to keep from increasing the number of times quantization processing is performed more than necessary. Therefore, in a series of image processing, it is possible to output an image for which various problems, including density unevenness, are suppressed for all of density portions without lowering the processing speed.

Embodiment 3

In the second embodiment, a method was explained in which the color conversion/image data division unit adjusts the distribution rate in order to control the dot overlap rate. In this embodiment, the dot overlap rate is controlled by providing features to the quantization process when quantizing the plurality of multi-value density data that is generated by the color conversion/image data division unit. When doing this, the dot overlap rate may also be controlled by the quantization processing unit cooperating with adjustment of the distribution rate by the color conversion/image data division unit.

Figure 15B:
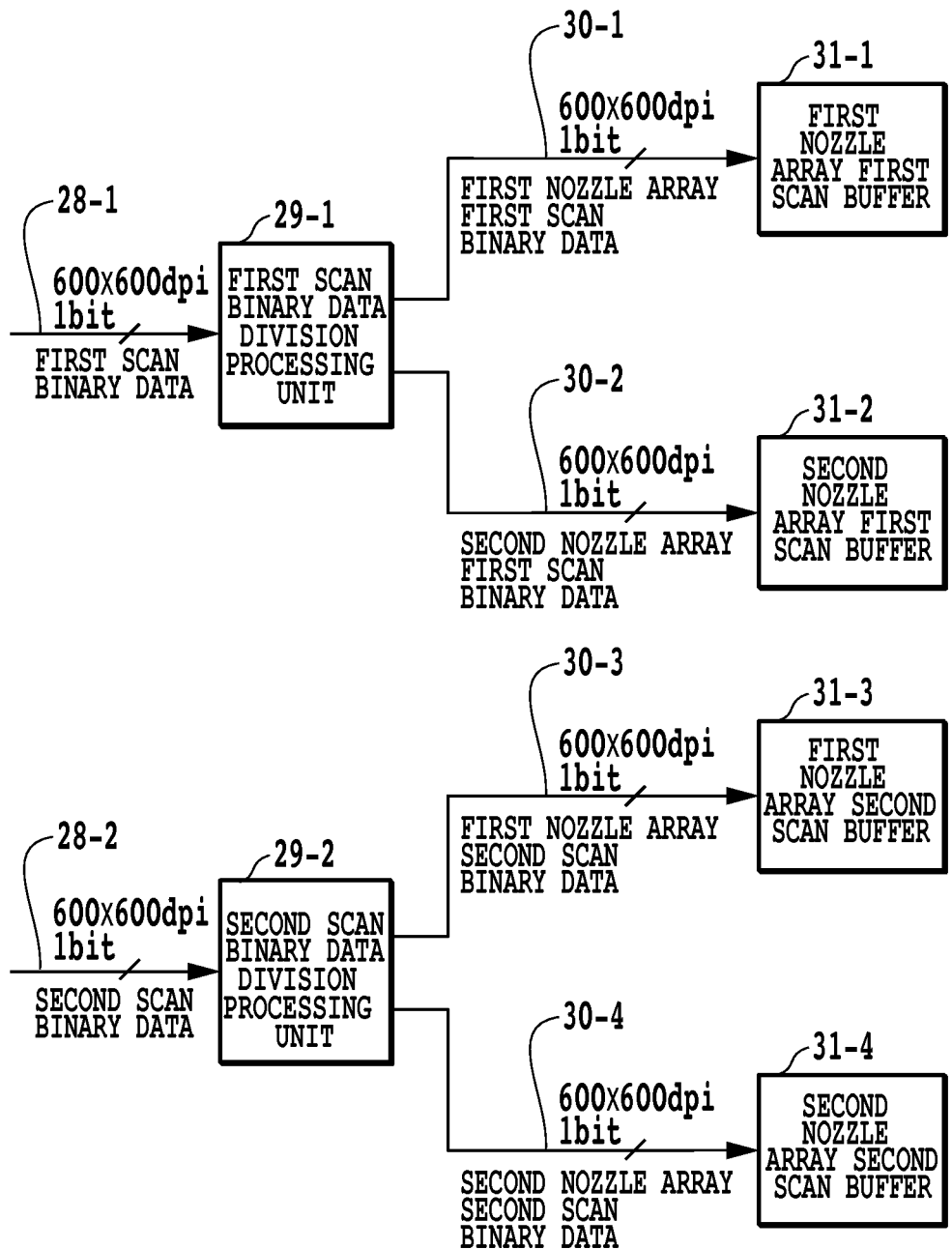

FIG. 15 is a block diagram for explaining image processing when performing multipass printing for completing an image in the same area of a printing medium by two printing scans. In this embodiment, except for the quantization processing unit 25, the construction is the same as that of the second embodiment that was explained using FIG. 14. Therefore, only the processing executed by the quantization processing unit 25 will be explained here.

Figure 9:
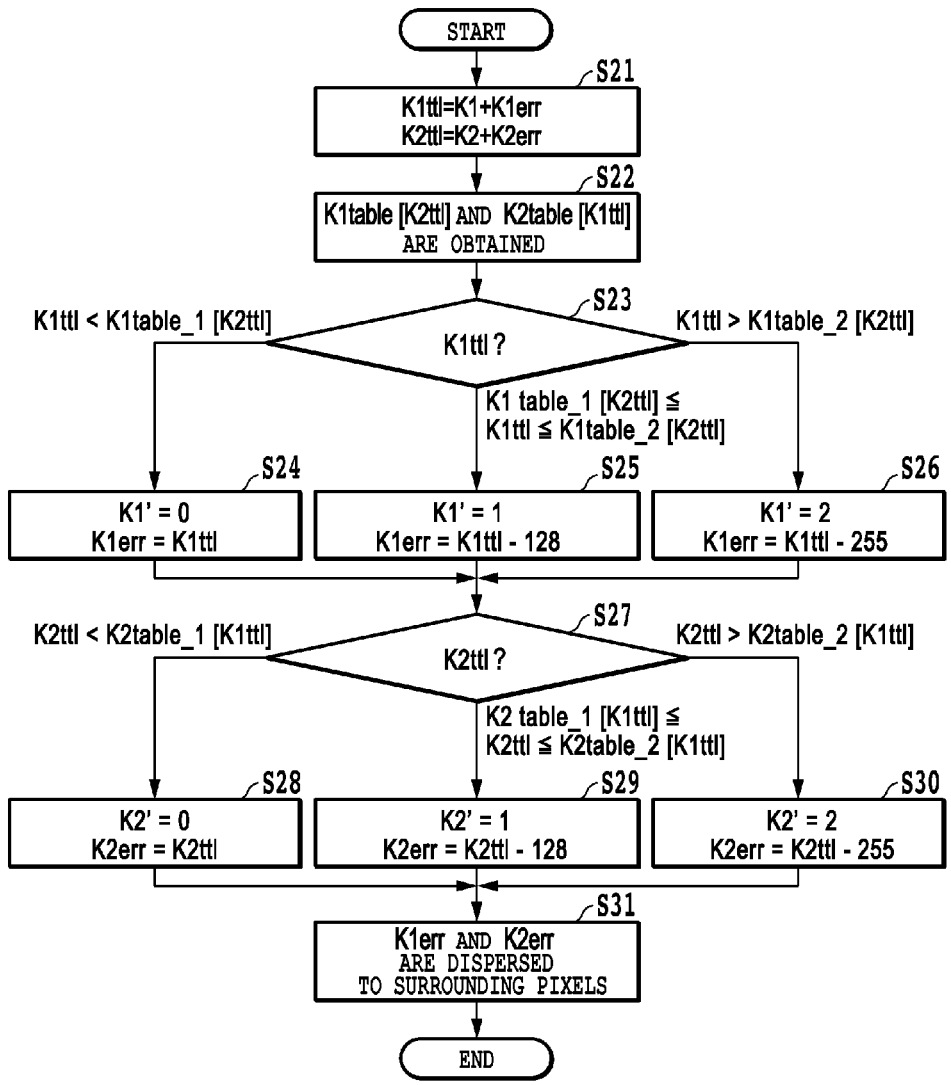
FIG. 9 is a flowchart for explaining the processing steps that are executed by the quantization processing unit of a third embodiment.

FIG. 9 is a flowchart for explaining processing steps that are executed by the quantization processing unit 25 of this embodiment. In this flowchart, the two objects to be quantized, or in other words, input multi-value data 24-1 for the first scan and input multi-value data 24-2 for the second scan are indicated as K1 and K2, respectively, and have values 0 to 255. In addition, K1err and K2err are accumulated error values that are generated from surrounding pixels for which quantization processing has already been completed, and K1ttl and K2ttl are totaled values of the input multi-value data (K1, K2) and accumulated error values (K1err, K2err). Furthermore, K1' and K2' in the flowchart indicate 3-value quantized data for the first printing scan and second printing scan.

In this embodiment, threshold values (quantization parameters) that are used when setting the 3-value quantized data K1' and K2', differ depending on the values K1ttl and K2ttl. For this purpose, the values K1ttl and K2ttl are taken to be arguments, and a threshold value table is prepared in advance from which two threshold values, which have different sizes, are selected corresponding to these arguments. Here, when setting K1', K1table_1[K2ttl] is a first threshold value for comparison with K1ttl, and K1table_2[K2ttl] is a second threshold value that is larger than the first threshold value. Moreover, when setting K2', K2table_1[K1ttl] is a first threshold value for comparison with K2ttl, and K2table_2 [K1ttl] is a second threshold value that is larger than the first threshold value. Both K1table_1[K2ttl] and K1table_2 [K2ttl] are values that are selected from the threshold value table with K2ttl as an argument. Both K2table_1[K1ttl] and K2table_2[K1*ttl*] are values that are selected from the threshold value table with K1*ttl* as an argument.

When this process is started, first, in step S21 K1*ttl* and K2*ttl* are calculated. Next, in step S22, by referencing the threshold value table, the four threshold values are obtained from K1*ttl* and K2*ttl* that were calculated in step S21. The threshold values K1table_1[K2*ttl*] and K1table_2[K2*ttl*] are primarily set by referencing the table with K2*ttl* as an argument. Also, the threshold values K1table_2[K1*ttl*] and K2table_2[K1*ttl*] are primarily set by referencing the table with K1*ttl* as an argument.

Next, in steps S23 to S26, the value K1' is set, and in steps S27 to S30, the value K2' is set. More specifically, in step S23, the value K1*ttl* that was calculated in step S21 is compared with the threshold values K1table_1[K2*ttl*] and K1table_2 [K2*ttl*] that were obtained in step S22. When it is determined that K1*ttl*<K1table_1[K2*ttl*], then K1'=0, and the accumulated error value K1err (=K1*ttl*) is updated according to this output value (K1'=0) (step S24). Moreover, when it is determined that K1table_1[K2*ttl*]≤K1*ttl*≤K1table_2[K2*ttl*], then K1'=1, and the accumulated error value K1err (=K1*ttl*−128) is calculated according to this output value (K1'=1) and updated (step S25). Furthermore, when it is determined that K1table_2 [K2*ttl*]<K1*ttl*, then K1'=2, and the accumulated error value K1err (=K1*ttl*−255) is calculated according to this output value (K1'=2) and updated (step S26).

Next, in step S27, the value K1*tt*2 that was calculated in step S21 is compared with the threshold values K2table_1 [K1*ttl*] and K2table_2[K1*ttl*] that were obtained in step S22. When it is determined that K2*ttl*<K2table$_1$[K1*ttl*], then K2'=0, and the accumulated error value K2err (=K2*ttl*) is updated according to this output value (K2'=0) (step S28). Moreover, when it is determined that K2table_1[K1*ttl*]≤ K2*ttl*≤K2table_2 [K1*ttl*], then K2'=1, and the accumulated error value K2err (=K2*ttl*−128) is calculated according to this output value (K2'=1) and updated (step S25). Furthermore, when it is determined that K2table$_{2[K1}$*ttl*]<K2*ttl*, then K2'=2, and the accumulated error value K2err (=K2*ttl*−255) is calculated and updated according to this output value (K2'=2) (step S30).

After that, in step S31, the accumulated error values K1err and K2err that were updated in this way are diffused to the surrounding pixels for which quantization has not yet been completed according to the error-diffusion matrix illustrated in FIG. 7A or FIG. 7B. In this embodiment, the error-diffusion matrix illustrated in FIG. 7A is used for diffusing the accumulated error K1err to the surrounding pixels, and the error-diffusion matrix illustrated in FIG. 7B is used for diffusing the accumulated error K2err to the surrounding pixels.

In this embodiment, the two threshold values (quantization parameters) that are used for performing the quantization process on the first multi-value data (K1*ttl*) that corresponds to the first scan are set based on the second multi-value data (K1*ttl*) that corresponds to the second scan. Similarly, the two threshold values (quantization parameters) that are used for performing the quantization process on the second multi-value data (K2*ttl*) that corresponds to the second scan are set based on the first multi-value data (K1*ttl*) that corresponds to the first scan. In other words, the quantization process of multi-value data that corresponds to one scan of two scans, and the quantization process of multi-value data that corresponds to the other scan of two scans are both executed based on the multi-value data that corresponds to the one scan and the multi-value data that corresponds to the other scan. In this way, for example, the table contents can be adjusted in advance so that dots that are printed in one scan are as much as possible not printed in the pixels in which dots are printed in the other scan, or vice versa. As a result, it is possible to increase the suppression of density unevenness according to gradation, while at the same time keep a balance between worsening graininess and insufficient density.

Figure 13:
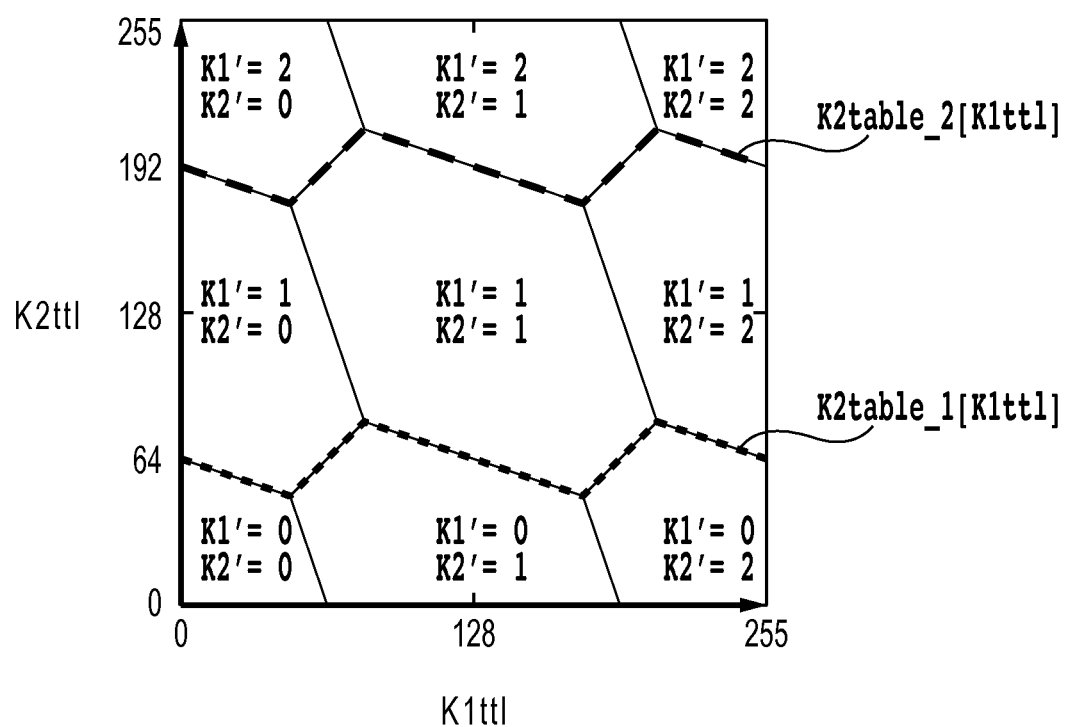
FIG. 13 is a diagram for explaining the correlation between one example of results from a quantization process, which is performed using threshold values that are entered in a specified threshold value table, and input values (K1*ttl* and K2*ttl*)

FIG. 13 is a diagram for explaining the correlation between an example of the results from performing quantization processing (binarization processing) using threshold values that are given in a specified threshold value table according to the flowchart in FIG. 9 and the input values (K1*ttl* and K2*ttl*). Both K1*ttl* and K2*ttl* *take on values* 0 to 255, and depending on the combinations of these, K1' and K2' are set as illustrated in the figure to 2-dot printing (2), 1-dot printing (1) or no printing (0). Here, the first threshold value K2table_1[K1*ttl*] that is used for quantization of K2*ttl* is indicated by the bold dotted line, and the second threshold value K2table_2[K1*ttl*] is indicated by the bold dashed line. For example, for a pixel in which both K1' and K2' become 2, that is, for a pixel corresponding to the upper right area of the figure, two dots are printed in 1×2 sub pixels in the first printing scan and second printing scan respectively. When K1' is 1 and K2' is 2, or in other words, in a pixel that corresponds to the area on the right side of the figure, 1 dot is printed in a 1×2 sub pixel in the first printing scan, and two dots are printed in a 1×2 sub pixel in the second printing scan. When both K1' and K2' are 0, or in other words, in a pixel that corresponds to the area at lower left of the figure, no dots are printed in either the first scan or second scan.

In this embodiment, a table is prepared in this way such that the threshold values change according to the values K1*ttl* and K2*ttl*, or in other words, a table is prepared for setting two threshold values for comparison with K2*ttl* (or K1*ttl*), using K1*ttl* (or K2*ttl*) as an argument. By doing this, as illustrated in FIG. 13, it is possible to change the threshold values for comparison with K2*ttl* (or K1*ttl*) according K1*ttl* (or K2*ttl*), and as a result, it is possible to control the dot overlap rate in 1×2 sub pixels.

It is also possible to prepare a plurality of kinds of threshold value tables in advance in order to obtain various results in addition to the results illustrated in FIG. 13, and by doing so, it is possible to obtain a suitable dot overlap rate according to various printing conditions such as the type of printing medium. As a result, it is possible to print good images on various kinds of printing media, for which problems in the image due to graininess, insufficient density and density unevenness have been suppressed in all density portions from low-density areas to high-density portions.

In the explanation above, the case of preparing a threshold table from which threshold values for quantization can be selected from arguments (K1*ttl*, K2*ttl*) was explained, however, the quantization method is not limited to the method described above. Quantization does not have to be such that output values (0 to 2) are set by comparison with threshold values. For example, in the case of two planes, a table can be prepared that primarily sets the values K1' and K2' by using both K1*ttl* and K2*ttl* as reference values. The details of such a table are omitted here, however, using a multi-dimensional table such as this has merits in that the control is more simple, and the dot overlap rate can be controlled with a higher degree of freedom. On the other hand, using a 1-dimensional threshold value table such as described above has merits in that it is possible to create a table that requires less memory space. It is also possible to use a 1-dimensional threshold value table that uses the sum of K1*ttl* and K2*ttl* as an argument. Furthermore, it is also possible to perform quantization processing by just performing branching and calculations without using a table at all. In that case, it is possible to obtain the effect of this embodiment by setting the coefficients that are used in the operations to values that make it possible to achieve the desired dot overlap rate. In such a case, it is possible to further reduce the amount of required memory space (size of ROM or RAM used) when compared with the case of preparing the table described above.

With the embodiment as explained above, quantization processing for each scan is performed according to multi-value data of each scan after dividing multi-value density data into data for a first scan and second scan. By doing so, it is possible to set the dot overlap rate higher in density portions where density unevenness is considered to be more of a problem than in other portions. When doing this, by making the resolution after this division process lower than that of the input multi-value density data, it is possible to prevent having to increase more than necessary the number of times quantization processing is performed. Therefore, in a series of image processing, it is possible to output an image for which various problems, including density unevenness, have been suppressed for all of density portions without a decrease in processing speed.

Other Embodiments

In the first through third embodiments, the case was explained in which processing is performed by lowering the resolution (600 dpi×300 dpi) in just the sub scanning direction with respect to the resolution (600 dpi×600 dpi) of the image that is input to the multi-value image data input unit. However, the degree to which the resolution is lowered can be changed in various ways according to a setting from the processing resolution setting unit. For example, the resolution (600 dpi×600 dpi) could be lowered in just the main scanning direction (300 dpi×600 dpi), or could be lowered in both the main scanning direction and sub scanning direction (300 dpi×300 dpi).

Figure 17:
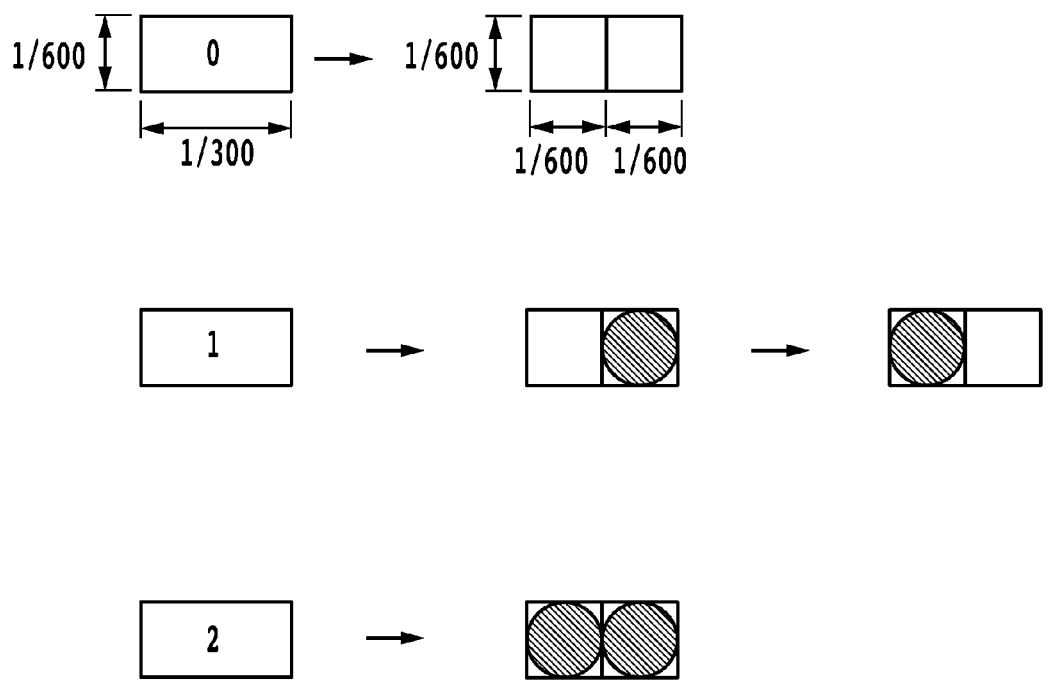
FIG. 17 is a diagram that illustrates one example of a dot arrangement pattern that is used in an index expansion process.

When the resolution is lowered in just the sub scanning direction as in the embodiments described above, an index pattern that is long in the sub scanning direction as illustrated in FIG. 12 is used. By using this kind of index pattern, it is possible to obtain an image that is resistant to a deviation in the printing position in the main scanning direction generally. On the other hand, when the resolution is lowered in just the main scanning direction such that the resolution is changed from (600 dpi×600 dpi) to (300 dpi×600 dpi), a dot arrangement pattern that is long in the main scanning direction is used as illustrated in FIG. 17. By using this kind of dot arrangement pattern, it is possible to obtain an image that is resistant to a deviation in the printing position in the sub scanning direction generally. The load on the quantization process itself is nearly the same whether the resolution is lowered in the vertical or horizontal direction. Therefore, the processing resolution setting unit can set the processing resolution according to the direction in which it is desired to further reduce the print deviation.

Moreover, when the color conversion/image data division unit lowers the resolution from (600 dpi×600 dpi) to (300 dpi×300 dpi), for example, the number of pixels that become the object of quantization processing is kept at $\frac{1}{4}(=\frac{1}{2}\times\frac{1}{2})$ that of when the resolution is not lowered. In this case, one 300 dpi×300 dpi pixel corresponds to four 600 dpi×600 dpi sub pixels, so in the quantization process, quantization to five values 0 to 4 may be performed.

Figure 16:
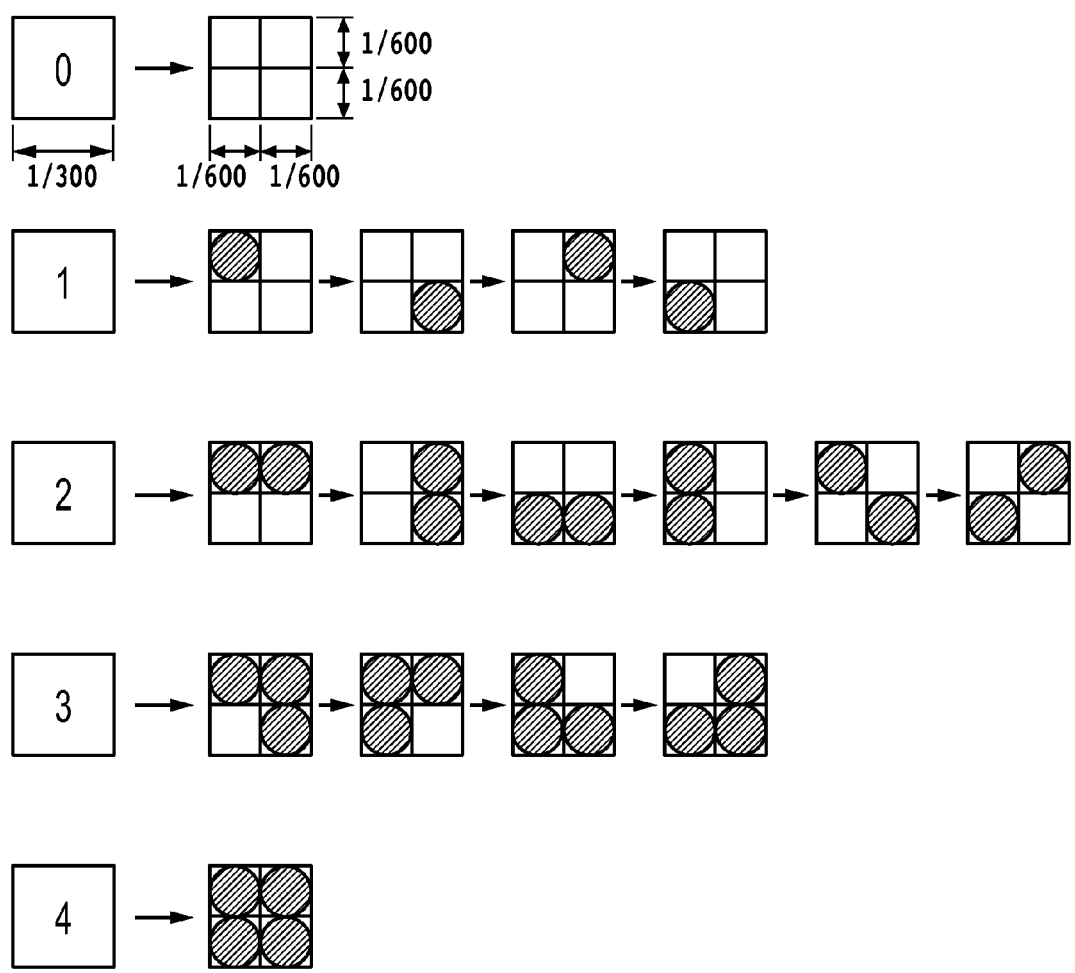
FIG. 16 is a diagram that illustrates one example of a dot arrangement pattern that is used in an index expansion process.

FIG. 16 is a diagram illustrating one example of a dot arrangement pattern that is used in the index expansion process. The left side of the figure illustrates pixels having 5 level values that are input to the index expansion process, and have one of the levels 0 to 4. On the other hand, the right side of the figure illustrates dot arrangement patterns for 2×2 sub pixels that are selected to correspond to the respective levels. When the level is 0, no dots are printed in any of the 2×2 sub pixels, however, as the level increases, then number of dots printed increases by one. In level 1 to level 3, a plurality of patterns having different dot arrangements are prepared, and these can be used sequentially or can be used selectively according to conditions. This kind of resolution reduction and index expansion processing can be applied to any of the embodiments 1 to 3.

The number of levels after quantization in the quantization process does not absolutely need to correspond to the number of sub pixels. For example, even though the resolution is lowered from (600 dpi×600 dpi) to (300 dpi×300 dpi), in the quantization process, quantization can be performed to three values instead of five values. In that case, the dot arrangement patterns that correspond to the levels could be for example, 0 dots in level 0, 2 dots in level 1, and 4 dots in level 3.

Control of the dot overlap rate that was made possible in the second and third embodiments can be made possible by using the index expansion process as explained in FIG. 10. FIG. 10 is schematic diagram for explaining the relationship between 3-value quantized data and the dot arrangement pattern that is converted by the index expansion processing unit in accordance to the first scan and second scan. The left side of the figure illustrates pixels having levels of three values that are input to the index expansion processing unit 27-1 or 27-2, with each pixel having a value 0 to 2. Each pixel has a resolution of 300 dpi×300 dpi, which corresponds to 2×2 sub pixels having a resolution of 600 dpi×600 dpi. On the other hand, the center columns in the figure illustrate dot arrangement patterns of the 600 dpi×600 dpi 2×2 sub pixels that are selected according to the respective level. The dot arrangement pattern that corresponds to K1' is the dot arrangement pattern for the first scan, and the dot arrangement pattern that corresponds to K2' is the dot arrangement pattern for the second scan. In the figure, the sub pixels that are indicated by diagonal lines indicate that one dot is printed in that sub pixels during the specified scan.

The right side of the figure illustrates the sum of the dot arrangement pattern for the first scan and the dot arrangement pattern for the second scan (dot overlap state) that is set in thus way, and the overlap rate for each respective case. In the figure, sub pixels for which no dots are printed in either the first scan or second scan are illustrated as empty, and sub pixels for which one dot is printed in either the first scan or second scan are illustrated using diagonal lines. Furthermore, sub pixels for which one dot is printed in both the first scan and second scan for a total of two overlapping dots are illustrated by a solid black. In this way, it is possible to set the dot arrangement for the dot arrangement pattern in advance so that the desired dot overlap rate is obtained. In addition, control of the dot overlap rate that uses this kind of index expansion processing can be performed together with control of the dot overlap rate by a different method such as that used in the first embodiment of course, as well at that used in the second and third embodiments.

When the resolution is lowered from (600 dpi×600 dpi) to (300 dpi×300 dpi) as described above, the number of pixels that become the object of the quantization process becomes approximately ¼ that when the resolution is not lowered. In other words, in 4-pass multipass printing, when divided into four planes, the number of pixels that are the object of processing can be made to be nearly the same $(4\times\frac{1}{4}=1)$ as the case in which division processing is not performed. In addition, in 2-pass multipass printing, when divided into two planes, the number of pixels can be made to be ½ $(2\times\frac{1}{4}=\frac{1}{2})$ that of the case in which division processing is not performed, and thus even faster processing can be expected. Generally, when performing M-pass printing (M is an integer 2 or greater), by making the processing resolution 1/m times in the main scanning direction and 1/n times in the sub scanning direction such that m×n=M is satisfied, it is possible to perform the quantization process with the same load as when the division process was not performed even though the division process was performed to divide the data into M planes. However, the present invention is not limited to lowering the resolution so that m×n=M is satisfied. In image construction in which the quantization process is performed after dividing the data into a plurality of planes, as long as the image is constructed by performing the quantization process after lowering the resolution to a resolution that is lower than the input resolution, it is possible to obtain the effect of the present invention of reducing the processing load that accompanies dividing the data. In this case, in index expansion after the quantization process, the resolution can be expanded to a resolution that is higher than the input resolution (increased resolution).

However, when lowering the resolution, the original detailed image information of pixels is lost due to making the image data in a plurality of adjacent pixels uniform, so after that, even though the original resolution is restored by index expansion processing, the lost information is not completely restored. Therefore, when the amount of resolution reduction (values of m and n) is very large, a decrease in image quality will stand out. In consideration of this, the resolution set by the processing resolution setting unit, or in other words, the amount of resolution reduction is preferably set to a suitable value that balances the number of division planes, the processing load, the required processing speed, and the image quality.

In the embodiments described above, the case was explained in which the color conversion/image data division unit converts the multi-value brightness data (RGB) to a plurality of multi-value density data (CMYK) corresponding to the printing scans in one step by using a 3-dimensional LUT. However, the present invention and this embodiment are not absolutely limited to this kind of construction. For example, the process of converting the color from RGB to CMYK and the process of dividing CMYK to a plurality of multi-value density data that corresponds to the printing scans can be independent. In this case, it does not matter whether the resolution conversion and the division process are performed in the RGB state before color conversion, or resolution conversion and the division process are performed in the CMYK state after color conversion. The resolution conversion process and division process could also be separately located before and after the color conversion process, where the before and after relationship of the resolution conversion process and division process is not particularly limited. In either case, in the stage of performing the quantization process, as long as multi-value CMYK data for a plurality of scans in which the processing resolution is made to be lower than the input resolution, it is possible to obtain the effect of the present invention of reducing the load of the quantization process.

Moreover, in the second and third embodiments, with the presumption that a printing head having two nozzle arrays of each color as illustrated in FIG. 11B will be used, the case was explained in which data was divided in the multi-value stage into a plane for the first printing scan and a plane for the second printing scan. In addition, after the data for each scan is converted to binary data by the index expansion process, that binary data is divided into data for the first nozzle array and for the second nozzle array by using a mask pattern having a complementary relationship. This kind of construction is effective when density unevenness between printing scans stands out more than density unevenness between nozzle arrays. However, the present invention is not limited to this kind of construction. When the density unevenness between nozzle arrays stands out more than the density unevenness between printing scans, and when the deviation in the printing position between nozzle arrays is emphasized more, it is possible to perform the division process in the opposite order as described above. In that case, the quantization process and index expansion process can be performed after performing division in the multi-value state to a plane for the first nozzle array and a plane for the second nozzle array, and after that, binary data can be divided for the first scan and for the second scan using a mask pattern.

In the embodiments described above, the case was explained in which four colors of ink CMYK were used, however, the number of types of ink colors that can be used are not limited to this. Light cyan (Lc), or light magenta (Lm) ink could be added to these 4 colors of ink, or special color ink such as red (R) or blue (B) ink could also be added. On the other hand, the present invention could also be applied to a mono-color mode in which only one color of ink is used. Furthermore, the invention could also be applied to a monochrome printer as well as a color printer.

Moreover, in the embodiments described above, the case of using a printer having the construction as illustrated in the electrical block diagram of FIG. 3 was explained, however; the present invention is not limited to this kind of construction. For example, the printer control unit and printer engine unit were explained as each being an independent module, however, the control unit and printer engine unit can share the same ASIC, CPU, ROM and RAM. In addition, in the figure, the control unit and printer engine unit are connected by a USB or IEEE 1284, which is a general-purpose I/F, however, the present invention could use any connection method. Moreover, the connection from the PC takes the form of a direct connection to the printer engine unit via a USB HUB, however, the control unit could also relay the image data. Furthermore, as necessary, the control unit could employ the form of sending image data from the PC to the printer engine unit after performing suitable image processing on the image data.

In the embodiment above, the case was explained in which image processing up to quantization is executed by the control unit 3000, and processing after that is executed by the printer engine 3004, however, the present invention is not limited to this kind of construction. As long as the series of processes described above are executed, any form of processing method, regardless of the hardware or software, is within the scope of the present invention.

Furthermore, in the embodiments described above, using a printer (image formation device) comprising a control unit 3000 having an image processing function as an example, an image process device that executes image processing that is characteristic of the present invention was explained, however the present invention is not limited to this kind of construction. A construction is possible in which the characteristic image processing of the present invention is executed by a host device in which a printer driver is installed (for example PC 3010 in FIG. 3) and image data after quantization processing or division processing is input to the printer. In such a case, the host (external device) that is connected to the printer corresponds to the image processor of the present invention.

The present invention can also be achieved by program code that comprises a program readable by a computer for making possible the image processing functions described above, or a memory medium on which that program code is stored. In this case, the computer (or CPU or MPU) of the host device or the image processor make possible the image processing described above by reading and executing the aforementioned program code. In order to make the computer execute the image processing described above in this way, the present invention includes a program that can be read by the computer, or a memory medium on which that program is stored.

It is possible to use, for example, a floppy disk (registered trademark), hard disk, optical disk, magnetic optical disk, CD-ROM, CD-R, magnetic tape, non-volatile memory card, ROM and the like as the memory medium for supplying the program code.

Moreover, by the computer reading and executing the program code, not only is it possible to achieve the functions of the embodiments described above, but based on the instruction of that program code, the OS operating on the computer can also perform part or all of the actual processing. Furthermore, after the program code has been written in the memory of a function expansion board that is inserted into the computer, or a function expansion unit that is connected to the computer, the CPU can perform part or all of the processing based on the instructions of that program.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-235328, filed on Oct. 9, 2009, which is hereby incorporated by reference herein in its entirety.

What is claimed is:

1. An image processor for processing input image data that corresponds to a pixel area in order to perform printing in the pixel area on a printing medium by a plurality of relative movements of a printing unit for printing a same color dot, with respect to a printing medium, comprising:
    a first generation unit configured to generate a plurality of multi-value data for the same color corresponding to the plurality of relative movements, that have a lower resolution than the input image data, based on the input image data; and
    a second generation unit configured to generate a plurality of binary data for the same color having a higher resolution than the multi-value data corresponding to the plurality of relative movements, based on the plurality of multi-value data.

2. The image processor according to claim 1, wherein the resolution of the binary data is equal to the resolution of the input image data.

3. The image processor according to claim 1, wherein the first generation unit generates the multi-value image data having the lower resolution than the input image data by performing an averaging process of a plurality of the input image data corresponding to a plurality of pixel areas.

4. The image processor according to claim 1, wherein the first generation unit generates the multi-value image data having the lower resolution than the input image data by performing an averaging process of a plurality of the multi-value image data for the same color corresponding to a plurality of pixel areas.

5. The image processor according to claim 1, wherein the second generation unit generates a plurality of quantized data corresponding to the plurality of relative movements by performing quantization processing to each of the plurality of multi-value data, wherein each of the plurality of the quantized data has a lower number of levels for representing a gradation of the pixel area than that of the multi-value data; and generates the plurality of the binary data, by performing binarization processing to each of the plurality of the quantized data corresponding to the plurality of relative movements.

6. The image processor according to claim 5, wherein the second generation unit generates the binary data having the higher resolution than the quantized data by determining printing dot or not printing dot to a plurality of sub areas in the pixel area respectively according to the number of levels of the quantized data corresponding to the pixel area.

7. The image processor according to claim 1, wherein the second generation unit generates the binary data having the higher resolution than the multi-value data by determining printing dot or not printing dot to a plurality of sub areas in the pixel area respectively according to a value represented by the multi-value data corresponding to the pixel area.

8. The image processor according to claim 7, wherein the second generation unit generates the binary data by determining printing dot or not printing dot to a plurality of sub areas respectively, by referencing a dot arrangement pattern determined for a number of dots and arrangement of dots in the pixel area.

9. An image processor for processing input image data that corresponds to a pixel area in order to perform printing in the pixel area on a printing medium by a plurality of relative movements of a printing unit for printing a same color dot, with respect to the printing medium, comprising:
    a setting unit configured to set one mode from among a plurality of printing modes that include a first mode for printing in the pixel area by performing M (where M is an integer larger than 2) number of relative movements, and a second mode for printing in the pixel area by performing N (where N is an integer larger than 3 and N>M) number of relative movements; and
    a processing unit configured to, when the first mode has been set by the setting unit,
    (a) generate a plurality of multi-value image data for the same color corresponding to the plurality of relative movements, that have a lower resolution than the input image data, based on the input image data,
    (b) generate a plurality of quantized data corresponding to the plurality of relative movements, by performing quantization processing to each of the plurality of multi-value image data for the same color corresponding to the plurality of relative movements, and
    (c) generate a plurality of binary data corresponding to the plurality of relative movements, that have a higher resolution than the quantized data by performing binarization processing to each of the plurality of quantized data corresponding to the plurality of relative movements,
    and, when the second mode has been set by the setting unit, (d) generate a binary data for the same color by performing binarization processing of the input image data, and (e) divide the binary data for the same color to divisions corresponding to the plurality of relative movements.

10. An image processor for processing input image data that corresponds to a pixel area in order to perform printing in the pixel area on a printing medium by a plurality of relative movements of a printing unit for printing a same color dot, with respect to the printing medium, comprising:

a setting unit configured to set one mode from among a plurality of printing modes that include a first mode for printing in the pixel area by performing M (where M is an integer larger than 2) number of relative movements, and a second mode for printing in the pixel area by performing N (where N is an integer larger than 3 and N>M) number of relative movements; and a processing unit configured to, when the first mode has been set by the setting unit, (a) generate a plurality of multi-value image data for the same color corresponding to the plurality of relative movements, that have a lower resolution than the input image data, based on the input image data; and (b) generate a plurality of binary data that have a higher resolution than the multi-value data corresponding to the plurality of relative movements, based on the plurality of multi-value data for the same color corresponding to the plurality of relative movements, and, when the second mode has been set by the setting unit, (c) generate a plurality of multi-value data corresponding to the plurality of relative movements, that have a resolution equal to the resolution of the input image data, based on the input image data, and (d) generate a plurality of binary data corresponding to the plurality of relative movements, by performing binarization processing to each of the plurality of multi-value data for the same color corresponding to the plurality of relative movements.

11. The image processor according to claim 10, wherein the processing unit is further configured to, when the first mode has been set by the setting unit, (e) generate a plurality of quantized data corresponding to the plurality of relative movements, by performing quantization processing to each of the plurality of multi-value data for the same color corresponding to the plurality of relative movements, and (f) generate the plurality of binary data corresponding to the plurality of relative movements by performing binarization processing to each of the plurality of quantized data corresponding to the plurality of relative movements.

12. An image processing method for processing input image data that corresponds to a pixel area in order to perform printing in the pixel area on a printing medium by a plurality of relative movements of a printing unit for printing a same color dot, with respect to the printing medium, comprising:

a step of generating a plurality of multi-value image data for the same color corresponding to the plurality of relative movements, that have a lower resolution than the input image data, based on the input image data; and a step of generating a plurality of binary data that have a higher resolution than the multi-value data for the same color corresponding to the plurality of relative movements, based on the plurality of multi-value data.

13. An image processor for processing input image data that corresponds to a pixel area in order to perform printing in the pixel area on a printing medium by a relative movement of a plurality of nozzle arrays in which nozzles for printing same color dot are arrayed, with respect to a printing medium, comprising:

a first generation unit configured to generate a plurality of multi-value data for the same color corresponding to the plurality of nozzle arrays, that have a lower resolution than the input image data, based on the input image data; and a second generation unit configured to generate a plurality of binary data for the same color having a higher resolution than the multi-valued data for the same color corresponding to the plurality of nozzle arrays, based on the plurality of multi-valued data.

14. The image processor according to claim 13, wherein the second generation unit generates the plurality of quantized data corresponding to the plurality of nozzle arrays by performing quantization processing to each of the plurality of multi-value data, wherein each of the plurality of the quantized data has a lower number of levels for representing a gradation of the pixel area than that of the multi-value data, and generates the plurality of the binary data, by performing binarization processing to each of the plurality of the quantized data corresponding to the plurality of nozzle arrays.

15. The image processor according to claim 14, wherein the second generation unit generates the binary data having a higher resolution than the quantized data by determining printing dot or not printing dot to a plurality of sub areas in the pixel area respectively according to the number of levels of the quantized data corresponding to the pixel area.

16. The image processor according to claim 15, wherein the second generation unit generates the binary data by determining printing dot or not printing dot to a plurality of sub areas respectively by referencing a dot arrangement pattern determined for a number of dots and arrangement of dots in the pixel area.

17. The image processor according to claim 13, wherein the resolution of the binary data is equal to the resolution of the input image data.

18. The image processor according to claim 13, wherein the first generation unit generates the multi-value image data having the lower resolution than the input image data by performing an averaging process of a plurality of the input image data corresponding to a plurality of pixel areas.

19. The image processor according to claim 13, wherein the first generation unit generates the multi-value image data having the lower resolution than the input image data by performing an averaging process of a plurality of the multi-value image data for the same color corresponding to a plurality of pixel areas.

20. The image processor according to claim 13, wherein the second generation unit generates the binary data having a higher resolution than the multi-valued data by determining printing dot or not printing dot to a plurality of sub areas in the pixel area respectively according to a value represented by the multi-value data corresponding to the pixel area.

* * * * *